United States Patent [19]
Amano

[11] Patent Number: 5,469,377
[45] Date of Patent: Nov. 21, 1995

[54] FLOATING POINT COMPUTING DEVICE FOR SIMPLIFYING PROCEDURES ACCOMPANYING ADDITION OR SUBTRACTION BY DETECTING WHETHER ALL OF THE BITS OF THE DIGITS OF THE MANTISSA ARE 0 OR 1

[75] Inventor: Yoshinobu Amano, Ibaragi, Japan

[73] Assignee: NEC Corporation, Tokyo, Japan

[21] Appl. No.: 107,568

[22] Filed: Aug. 18, 1993

[30] Foreign Application Priority Data

Aug. 18, 1992 [JP] Japan ..................... 4-218857

[51] Int. Cl.$^6$ ..................... G06F 7/38; G06F 7/00
[52] U.S. Cl. ..................... 364/748; 364/736.5
[58] Field of Search ..................... 364/748, 736.5, 364/787

[56] References Cited

U.S. PATENT DOCUMENTS

| | | | |
|---|---|---|---|
| 3,983,382 | 9/1976 | Weinberger | 364/736.5 |
| 4,815,019 | 3/1989 | Bosshart | 364/736.5 |
| 4,924,422 | 5/1990 | Vassiliadis et al. | 364/736.5 |
| 5,020,016 | 5/1991 | Nakano et al. | 364/736.5 |
| 5,091,874 | 2/1992 | Watanabe et al. | 364/736.5 |
| 5,258,942 | 11/1993 | Liu et al. | 364/736.5 |
| 5,262,973 | 11/1993 | Richardson | 364/736 |
| 5,270,955 | 12/1993 | Bosshart et al. | 364/736.5 |

FOREIGN PATENT DOCUMENTS 61-33539  2/1986  Japan.

OTHER PUBLICATIONS

Computer Architecture and Organization, John P. Hayes, pp. 197–198 (undated).

Primary Examiner—Tan V. Mai
Attorney, Agent, or Firm—Sughrue, Mion, Zinn, Macpeak & Seas

[57] ABSTRACT

A floating point computing device having a mantissa register for storing a mantissa of a floating-point number, a detecting circuit for determining the bit states of the consecutive bits of the mantissa register, and a round and normalize data generating circuit for generating, on the basis of the output of the detecting circuit, information for controlling rounding and normalization. The detecting circuit determines whether all the bits of the digits of the mantissa register are 0 or whether they are 1. In response to the output of the detecting circuit, the round and normalize data generating circuit generates information including the kind of rounding operation and a rounding constant. When the resultant mantissa is negative, the kind of computation is indicative of subtraction. Consequently, the complement processing of the mantissa and the rounding operation are executed at the same time.

19 Claims, 21 Drawing Sheets

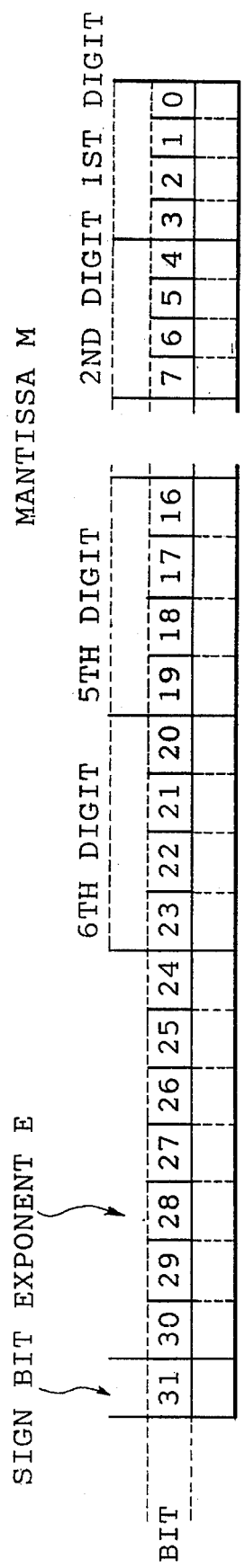
FIG. 1(a)
FIG. 1(c)
FIG. 1(d)
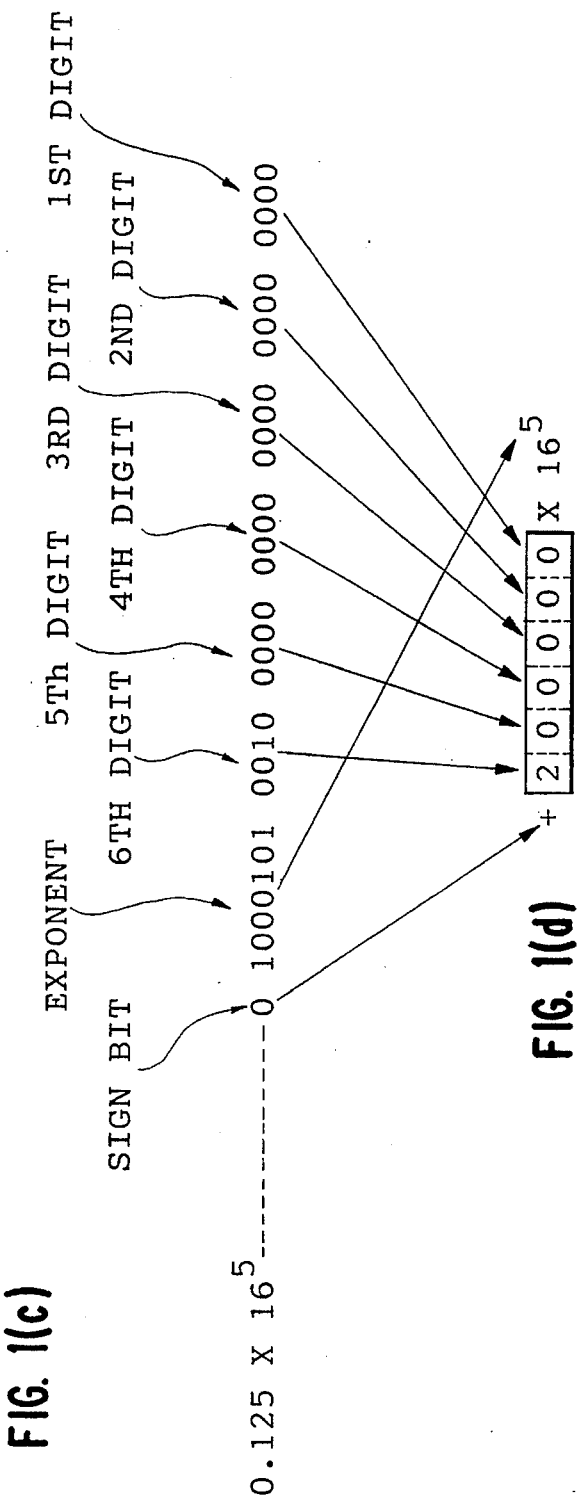

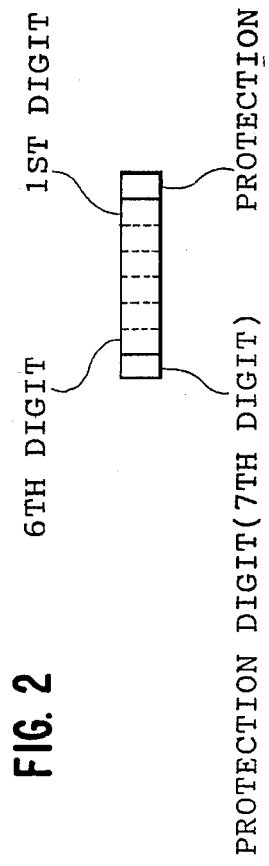

SIGN PROCESSING

POSTPROCESSING OF MANTISSA

| x1  | x2     | y1  | y2  | y3  | y4  | y5  |
|-----|--------|-----|-----|-----|-----|-----|
|     | x2 < 0 | "0" | "0" | 1x1 | "1" | 1x1 |
| "0" | x2 = 0 |     |     |     |     |     |
|     | 0 < x2 | "0" | "1" | x2  | "1" | 1x1 |
| "1" | *      | "1" | *   | *   |     |     |

* = DON'T CARE

| x1 | x2, x3 | y1 | y2 | y3 |
|---|---|---|---|---|
| "0" | x2  x3 | "0" | "0" | * |
| "0" | x2  x3 | "0" | "1" | * |
| "1" | x2  x3 | "0" | "1" | * |
| "1" | x2  x3 | "0" | "0" | * |

* = DON'T CARE

| y1 | y2 | y3 |
|---|---|---|
| "1" | x1 | x2 |

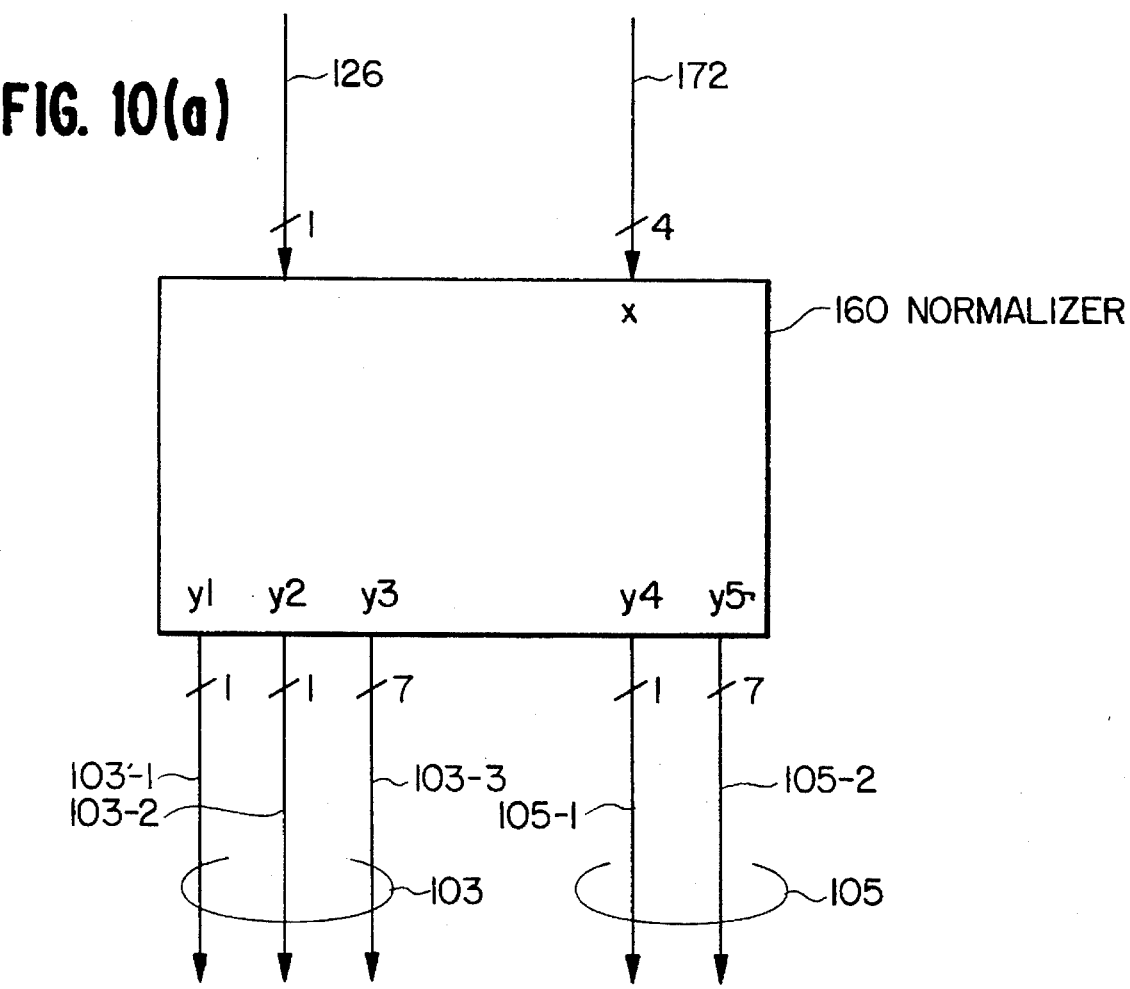

FIG. 11(b)1

| CASE | x1 | x2 | x3 | x4 | y1 | y2 | y3 |
|---|---|---|---|---|---|---|---|
| 1 | "0" | "*" | "0********" | "*********" | "0" | "10" | +1 |
| 2 | "0" | "0" | "10*******" | "0111111*" | "0" | "01" | +1 |
| 3 | "0" | "1" | "10*******" | "0111111*" | "0" | "01" | 0 |
| 4 | "0" | "*" | "10*******" | EXCEPT "0111111*" | "0" | "00" | +1 |
| 5 | "0" | "*" | "110******" | "*********" | "0" | "00" | −1 |
| 6 | "0" | "*" | "1110*****" | "*********" | "0" | "00" | −2 |
| 7 | "0" | "*" | "11110****" | "*********" | "0" | "00" | −3 |
| 8 | "0" | "*" | "111110***" | "*********" | "0" | "00" | −4 |
| 9 | "0" | "*" | "1111110**" | "*********" | "0" | "00" | −5 |
| 10 | "0" | "*" | "11111110*" | "*********" | "0" | "00" | −6 |
| 11 | "0" | "*" | "11111111" | "*********" | END OPER. | | |
| 12 | "1" | "*" | "*******" | "0******" | UNEXIST. | | |

| | | | | | | | |
|---|---|---|---|---|---|---|---|
| 13 | "1" | "*" | "*******" | | "10*****" | "1" | "01" | 0 |
| 14 | "1" | "*" | "00111111" | | "110******" | "1" | "00" | 0 |
| 15 | "1" | "*" | EXCEPT "00111111" | | "110******" | "1" | "00" | -1 |
| 16 | "1" | "*" | "00011111" | | "1110*****" | "1" | "00" | -1 |
| 17 | "1" | "*" | EXCEPT "00011111" | | "1110*****" | "1" | "00" | -2 |
| 18 | "1" | "*" | "00001111" | | "11110****" | "1" | "00" | -2 |
| 19 | "1" | "*" | EXCEPT "00001111" | | "11110****" | "1" | "00" | -3 |
| 20 | "1" | "*" | "00000111" | | "111110***" | "1" | "00" | -3 |
| 21 | "1" | "*" | EXCEPT "00000111" | | "111110***" | "1" | "00" | -4 |
| 22 | "1" | "*" | "00000011" | | "1111110**" | "1" | "00" | -4 |
| 23 | "1" | "*" | EXCEPT "00000011" | | "1111110**" | "1" | "00" | -5 |
| 24 | "1" | "*" | "00000001" | | "11111110*" | "1" | "00" | -5 |
| 25 | "1" | "*" | "00000000" | | "11111111" | UNEXIST. | | |

\* = DON'T CARE

| z | y1 | y21 | y22 |
|---|----|-----|-----|
| "0" |  | x1 | x2 |
| "1" | $\overline{x1}$ |  |  |

| z1 | z2 | y1 | y2 | y3 |
|----|----|----|----|----|
| "0" | "0" | x1+z3 | | |
| "0" | "1" | | x2+z3 | |
| "1" | * | | | x1−x2 |

* = DON'T CARE

| z1 | y1 | y2 |
|---|---|---|
| "0" | x1 SHIFTED z2 DIGITS TO RIGHT | |
| "1" | | x2 SHIFTED z2 DIGITS TO RIGHT |

| z1 | z2 | z3 | y1 |
|----|----|----|----|
| "0" | "0" | * | x1+x2 |
| "0" | "1" | * | x1-x2 |
| "1" | "0" | "00" | x1 |
| "1" | "0" | "01" | x1+00000008H |
| "1" | "0" | "10" | x1+00000080H |
| "1" | "1" | "00" | -x1 |
| "1" | "1" | "01" | 00000008H-x1 |

* = DON'T CARE

FLOATING POINT COMPUTING DEVICE FOR SIMPLIFYING PROCEDURES ACCOMPANYING ADDITION OR SUBTRACTION BY DETECTING WHETHER ALL OF THE BITS OF THE DIGITS OF THE MANTISSA ARE 0 OR 1

BACKGROUND OF THE INVENTION

The present invention relates to a device for computing a floating point number and, more particularly, to a floating point number computing device capable of simplifying a procedure to follow the computation of a floating-point number so as to promote rapid floating-point computation.

The present invention is applicable to a computing device using a floating-point number format whose base is 16. One of the conventional floating-point number formats is taught by John P. Hayes in "COMPUTER ARCHITECTURE AND ORGANIZATION", pp. 197–198. In this type of format, four bits of a mantissa are treated as a single unit. Let the unit consisting of such four bits be referred to as a digit hereinafter. The values on the consecutive digits of the mantissa are each represented by a single digit hexadecimal number. The mantissa consists of a predetermined number of digits. The predetermined number of digits and the predetermined number will be referred to as "valid digits" and "a valid number of digits", respectively.

In the event of computation, protection bits are added to opposite ends of the valid digits to enhance the precision of the result of computation. Let the number of digits inclusive of the protection bits be called "an extended number of digits". During computation, various operations are executed with the precision of the extended number of digits.

After the computation, three different kinds of processing are employed to determine the result of computation by the valid number of digits, as follows.

In the first processing, "postprocessing of a mantissa", (i.e., processing wherein, when the result of computation of a mantissa is negative a complement of the mantissa is computed). The postprocessing of the mantissa is accompanied by the inversion of a sign bit. The inversion of a sign bit will be called "sign processing" hereinafter.

The second processing is "rounding" corresponding to rounding a decimal number to the nearest whole number. Specifically, rounding adds hexadecimal 8H to the protection bit immediately following the valid digits.

The third processing is "normalization" which shifts the result of computation to prevent the value on the most significant valid digit from being zero. At the same time, normalization corrects an exponent field.

A fundamental type of floating-point computing device sequentially executes the computation of a mantissa, postprocessing of the mantissa, first normalization, rounding, and second normalization in this order. Such four sequential steps are repeated every time a computation is effected. Therefore, by omitting some of the steps, it is possible to noticeably increase the processing speed of the program.

For example, an implementation for omitting the first normalization mentioned above is proposed in Japanese Patent Laid-Open Publication No. 33539/1986. This implementation has a first NAND gate circuit for detecting a condition wherein all the four bits constituting the most significant digit of the mantissa are "0", and a second NAND gate circuit for detecting a condition wherein all the four bits constituting the digit just to the right of the most significant digit are "0". A constant to be added by rounding is selected on the basis of the outputs of the first and second NAND gate circuits and the kind of computation to be performed. This constant is shifted beforehand by the number of shifts which the mantissa would otherwise undergo during the first normalization. This eliminates the need for the first normalization.

However, the implementation stated above cannot omit processing other than the first normalization.

SUMMARY OF THE INVENTION

It is therefore an object of the present invention to provide a floating point computing device capable of omitting, among the sequence of processing following the computation of a mantissa, the postprocessing of a mantissa and the first normalization.

A floating point computing device of the present invention a mantissa register for storing a mantissa of a floating-point number, an exponent register for storing an exponent of the floating-point number, a detecting circuit for determining (a) whether or not all the bits constituting consecutive digits of said mantissa register are 0 and (b) whether or not they are 1, a round and normalize data generating circuit responsive to the output of the detecting circuit for generating the kind of computation, a first numerical value, and a second numerical value, a mantissa computing circuit responsive to the kind of computation and the first numerical value for outputting, when the kind of computation is addition, a numerical value produced by adding the first numerical value to the content of the mantissa register or outputting, when the kind of operation is subtraction, a numerical value produced by subtracting the content of the mantissa register from the first numerical value, a shift computing circuit responsive to the second numerical value for outputting the content of the mantissa register shifted by a number of digits indicated by the second numerical value, and a exponent computing circuit responsive to the second numerical value for outputting a numerical value produced by subtracting the second numerical value from the content of the exponent register.

The mantissa computing section is capable of executing the postprocessing of a mantissa and the rounding operation at the same time, thereby omitting the postprocessing of a mantissa.

BRIEF DESCRIPTION OF THE DRAWINGS

The above and other objects, features and advantages of the present invention will become more apparent from the following detailed description taken with the accompanying drawings in which:

FIGS. 1(a) and 1(b) show a floating-point number format applicable to the present invention;

FIG. 1(c) shows a specific number represented by the format of FIGS. 1(a) and 1(b);

FIG. 1(d) shows a description format of the specific number of FIG. 1(c);

FIG. 2 shows a method of adding protection digits also applicable to the present invention;

FIG. 3(a) shows specific processing for normalization;

FIG. 3(b) shows specific processing for rounding;

FIG. 10(a) is a diagram showing the connection of a normalizer included in the embodiment;

FIG. 10(b) is a table representative of a relation between the inputs and the outputs of the normalizer;

FIG. 11(b) is a table representative of a relation between the inputs and the outputs of the round and normalize data generator;

DESCRIPTION OF THE PREFERRED EMBODIMENT

Referring to FIG. 1(a) of the drawings, a floating-point number format applicable to the present invention is shown. As shown, a single floating-point number N is represented by bits 0–31 (i.e., thirty-two bits in total). The bit 31 is a sign bit S. The sign bit S indicates that N is a positive number when it is "0" or that N is a negative number when it is "1". The bits 24–30 constitute an exponent field E for holding numbers 0–127. The bits 0–23 constitute a mantissa field M in which four consecutive bits define a single digit (e.g., the bits 0–3 constitute the first digit). The mantissa M is made up of the first digit to the sixth digit.

FIG. 1(b) shows a relation of the floating-point number N, sign bit S, exponent E, and Mantissa M. As shown, the forma has a base 16, so that E indicates the exponent of 16. In practice, the number produced by subtracting 64 from E is the exponent of 16. As a result, the exponent of 16 changes over a range of from −64 to +63.

FIG. 1(c) shows specific values of the consecutive bits occurring when a floating-point number 0.126×(16 xx 5) is represented by the above format. Here, "A xx B" is representative of a number produced by raising A to B-th power. In the following description, such a bit condition will be represented by the format shown in FIG. 1(d). In FIG. 1(d), the values on the bits of each digit is represented by a single digit hexadecimal number.

As shown in FIG. 2, protection digits are added to the mantissa M in the event when a computation is executed with the mantissa M. In a preferred embodiment to be described, a single protection digit is added to each of opposite ends of the mantissa M. The protection digit following the mantissa M and the protection digit preceding it will be referred to as the zeroth digit and the seventh digit, respectively.

Figure 3D:
FIG. 3(d) shows specific sign processing.
Figure 3C:
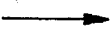
FIG. 3(c) shows specific processing for the postprocessing of a mantissa.

Referring to FIGS. 3(a) and 3(b), various kinds of processing to appear frequently hereinafter will be described. FIG. 3(a) shows a specific normalization procedure which is representative of ordinary normalization. FIG. 3(b) shows specific processing for rounding (i.e., for adding hexadecimal 8H to the zeroth digit of the mantissa M which should be rounded). FIG. 3(c) shows specific postprocessing of the mantissa M. Here, the postprocessing of the mantissa M refers to a procedure wherein when the mantissa M holds a negative number, and the 2's complement of the mantissa M is computed to convert the negative number to a positive number. FIG. 3(d) shows specific sign processing (i.e, processing for inverting the sign bit after the postprocessing of the mantissa M).

A reference will be made to FIG. 4 for describing the general construction of a floating-point computing device embodying the present invention. As shown, the computing device has a computation control circuit 100 for controlling the entire computation. A first and a second sign registers 210 and 220 respectively store the sign bit S of first floating point data and the sign bit S of second floating point data. A sign processing circuit 230 informs the computation control circuit 100 of the contents of the first and second sign registers 210 and 220. At the same time, in response to a command from the control circuit 100, the sign processing circuit 230 changes the contents of the sign registers 210 and 220. A first exponent register 310 stores the exponent E of the first floating point data, while a second exponent register 320 stores the exponent E of the second floating point data. An exponent computing circuit 330 reports the contents of the exponent registers 310 and 320 to the control circuit 100 and, in response to a command from the control circuit 100, changes the contents of the exponent registers 310 and 320. A first mantissa register 410 stores the contents of the mantissa M of the first floating point data and the contents of the protection digits added to the mantissa M. A second mantissa register 420 stores the contents of the mantissa M of the second floating point data as well as the contents of the protection digits added to the mantissa M. A shift computing circuit 500 shifts the contents of the mantissa registers 410 and 420 in response to a command from the control circuit 100. A mantissa computing section 600 selectively executes addition or subtraction with the first and second mantissa register 420 when instructed by the control circuit 100. A detecting circuit 700 detects the state of each bit of the first mantissa register 410 and reports it to the control circuit 100.

The constructions of the registers will be described in detail. The first and second sign registers 210 and 220 each comprises a 1-bit register. The first and second exponent registers 310 and 320 are each implemented as a 7-bit register. Further, the first and second mantissa registers 410 and 420 are each implemented as a 32-bit register. The mantissa registers 410 and. 420 each stores the zeroth bit to the seventh bit (i.e., the mantissa M with the protection digits).

The detecting circuit 700 is illustrated in FIG. 5(*a*). As shown in FIG. 5(*a*), an input signal line 417 and output signal lines 703 are connected to the detecting circuit. 700. Specifically, the signal line 417 is a 32-bit signal line connecting the first mantissa register 410 to the detecting circuit 700. The content of the mantissa register 410 is transferred to the detecting circuit 700 over the signal line 417. The signal lines 703 comprise 1-bit signal lines 703-1 and 703-2 and 8-bit signal lines 703-3 and 703-4 and connect the detecting circuit 700 to a round and normalize delta generator 170 within the computation control circuit 100. The signal lines 703-3 comprise signal lines 703-30 to 703-37 while the signal lines 703-4 comprise signal lines 703-40 to 703-47.

The detecting circuit 700 informs the computation control circuit 100 of four different kinds of information, as follow. To begin with, the detecting circuit 700 reports whether or not the number stored in the first mantissa register 410 is a positive number to the control circuit 100. Also, the detecting circuit 700 informs the control circuit 100 of whether or not the most significant bit of the zeroth digit of the mantissa register 410 is "0". Further, the detecting circuit 700 informs the control circuit 100 of whether or not all the bits of one digit of the mantissa register 410 are "0". In addition, the detecting circuit 700 reports whether or not all the bits of one digit of the mantissa register 410 are "1" to the control circuit 100.

FIG. 5(*b*) shows an arrangement for implementing such functions of the detecting circuit 700 (i.e., for connecting the signal lines 703 and the bits of the first mantissa register 410). As shown, the signal line 703-1 is connected to the most significant bit of the seventh digit of the mantissa register 410. Therefore, when the mantissa register 410 holds a negative number, "1" is sent over the signal line 703-1. The signal line 703-2 is connected to the most significant bit of the zeroth digit of the mantissa register 410.

The four bits of the zeroth digit of the mantissa register 410 are connected to the input terminals of a NOR gate 710. The output terminal of the NOR gate 701 is connected to the signal line 703-30. In this configuration, when all the bits of the zeroth digit of the register 410 are "0", "1" is sent over the signal line 703-30; in the other conditions, "0" is output to the signal line 703-30. Likewise, the "n" digit of the register 410 and the signal line 703-3n are connected to each other by a NOR gate 71n. It follows that "1" is sent over the signal line 703-3n when all the bits of the "n" digit are "0".

The four bits of the zeroth digit of the register 410 are connected to the input terminals of an AND gate 720. The output terminal and the AND gate 720 is connected to the signal line 703-40. Hence, when all the bits of the zeroth digit of the register 410 are "1", "1" is sent over the signal line 703-40; in the other conditions, "0" is output to the signal line 703-40. Likewise, the "n" digit of the register 410 and the signal line 703-4n are connected via an AND gate 72n. It follows that "1" is sent over the signal line 703-4n when all the bits of the "n" digit are "1".

Figure 4:
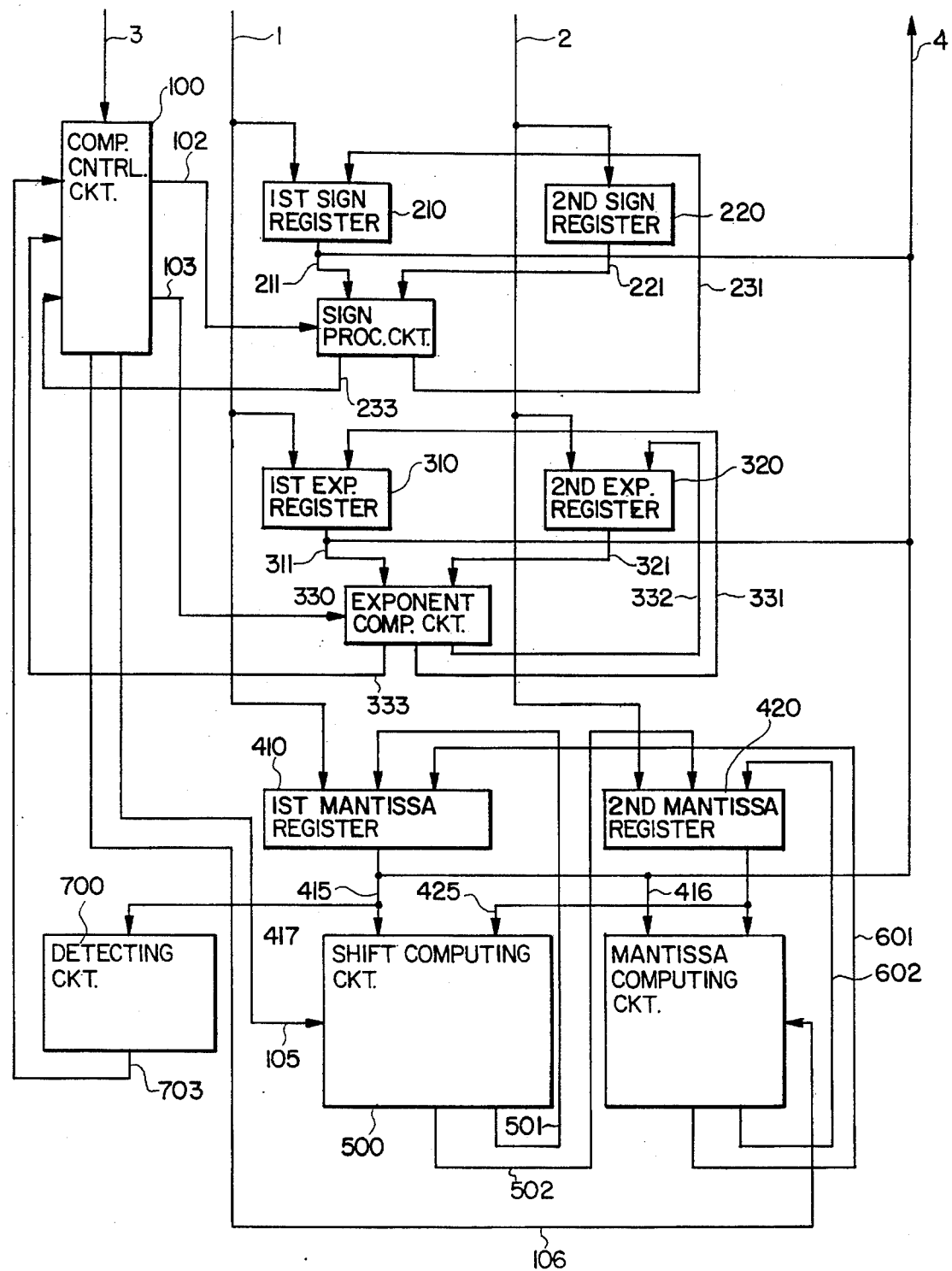
FIG. 4 is a block diagram schematically showing a floating point computing device embodying the present invention.

Referring to FIG. 4, the computation control circuit 100 has seven different functions, as follows. First, as the first and second floating point data respectively come in over the signal lines 1 and 2, the computation control circuit 100 stores them in the first and second signal registers 210 and 220, first and second exponent registers 310 and 320, and first and second mantissa registers 410 and 420. Second, the computation control circuit 100 decodes a command sent thereto from a host over a signal line 3. Third, the computation control circuit 100 controls the operation of the sign processing circuit 230. Fourth, the computation control circuit 100 controls the operation of the exponent computing circuit 330. Fifth, the computation control circuit 100 controls the operation of the shift computing circuit 500. Sixth, the computation control circuit 100 controls the operation of the mantissa computing circuit 600. Seventh, the computation control circuit 100 causes each of the above functions to be executed at a predetermined timing.

Figure 6:
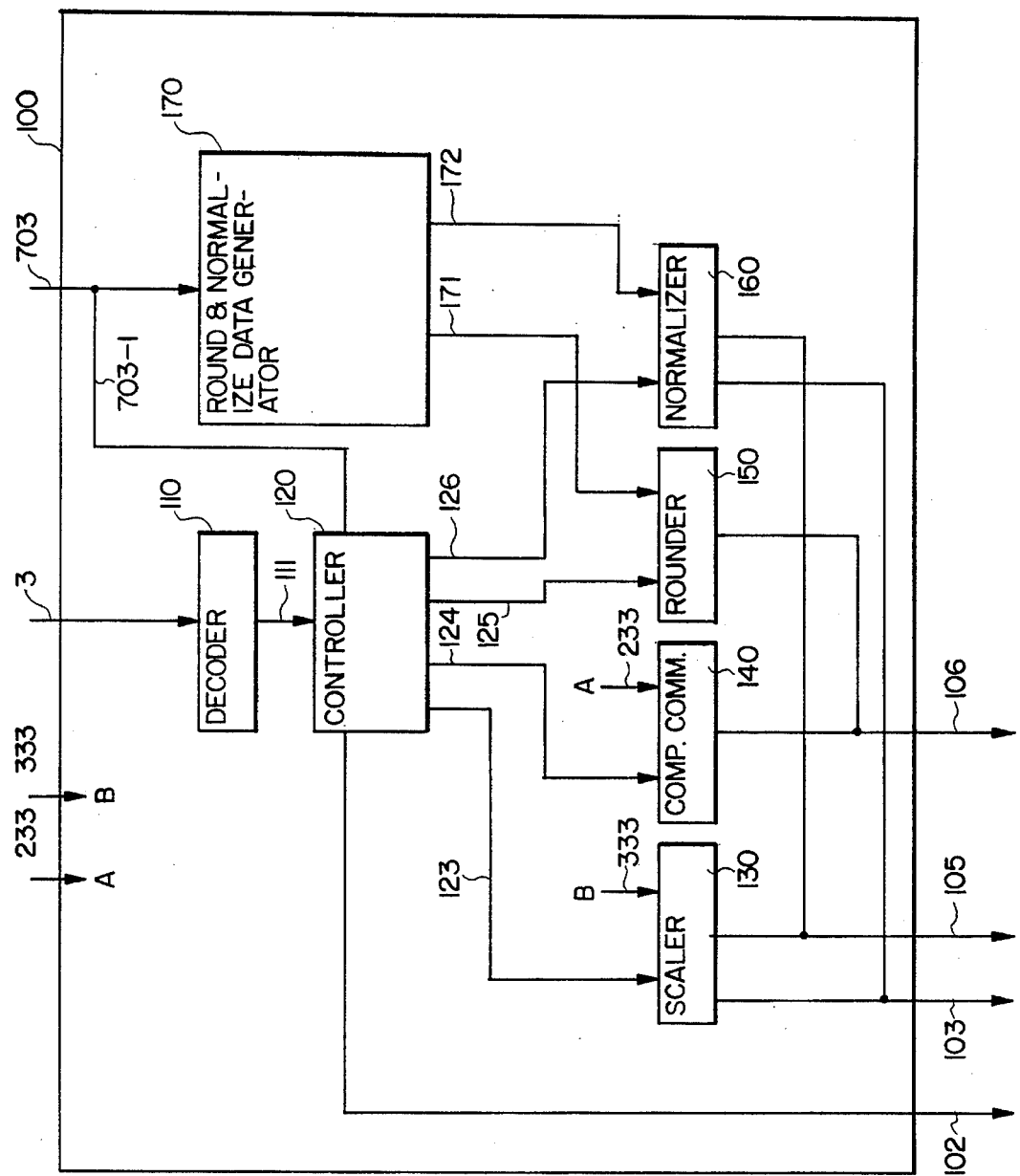
FIG. 6 is a block diagram schematically showing a computation control circuit also included in the embodiment.

FIG. 6 shows circuitry for implementing the second to sixth functions of the computation control circuit 100 described above. As shown, the computation control circuit 100 has a decoder 110. A scaler 130 scales the first and second mantissa registers 410 and 420. A computation commander 140 informs the mantissa computing circuit 600 of the kind of operation to be executed. A round and normalize data generator 170 generates information necessary for rounding and normalizing in association with the bit states of the first mantissa register 410 which are reported by the detecting circuit 700. A rounder 150 executes rounding on the basis of the information generated by the data generator 170. A normalizer 160 executes normalization in response to the information generated by the data generator 170. A controller 120 commands the scaler 130, computation commander 140, rounder 150 and normalizer 160 to start operating.

The first and seventh functions of the computation control circuit 100 can be implemented by a conventional implementation and will not be described specifically.

The decoder 110 has an ordinary arrangement and decodes a command received over the signal line 3. The result of decoding is produced on a signal line 111. Assume that "0" appears on the signal line 111 when the command on the signal line 3 is an add command, and that "1" appears on the line 111 when it is a subtract command.

As shown in FIG. 7(*a*), input signal lines 123 and 333 and output signal lines 103 and 105 are connected to the scaler 130. The signal lines 123 comprise 1-bit signal lines 123-1 and 123-2 and connect the controller 120 and scaler 130. An operation start signal from the controller 120 is sent to the scaler 130 over the signal line 123-1. Implemented as a 7-bit signal line, the signal line 333 connects the scaler 130 and exponent computing circuit 330. Integers −64 to +63 are sent over the signal line 333. The signal lines 103 comprise 1-bit signal lines 103-1 and 103-2 and a 7-bit signal line 103-3 which connect the computation control circuit 100 and exponent computing circuit 330. Integers −64 to +63 are sent over the signal line 103-3. The signal line 105 connects the computation control circuit 100 and shift computing circuit 500. The signal lines 105 comprise a 1-bit signal line 105-1 and a 7-bit signal line 105-2. Integers −64 to +63 are transferred over the signal line 105-2.

As the scaler 130 receives a numerical value from the exponent computing circuit 330 over the signal line 333, it determines a numerical value to be added to the first and second exponent registers 310 and 320 matching the received value. The determined value appears on the signal line 103-1. Specifically, the value produced on the signal line 333 is representative of a difference between the contents of the first and second exponent registers 310 and 320. This function is used to effect scaling.

Figures 7A, 7B:
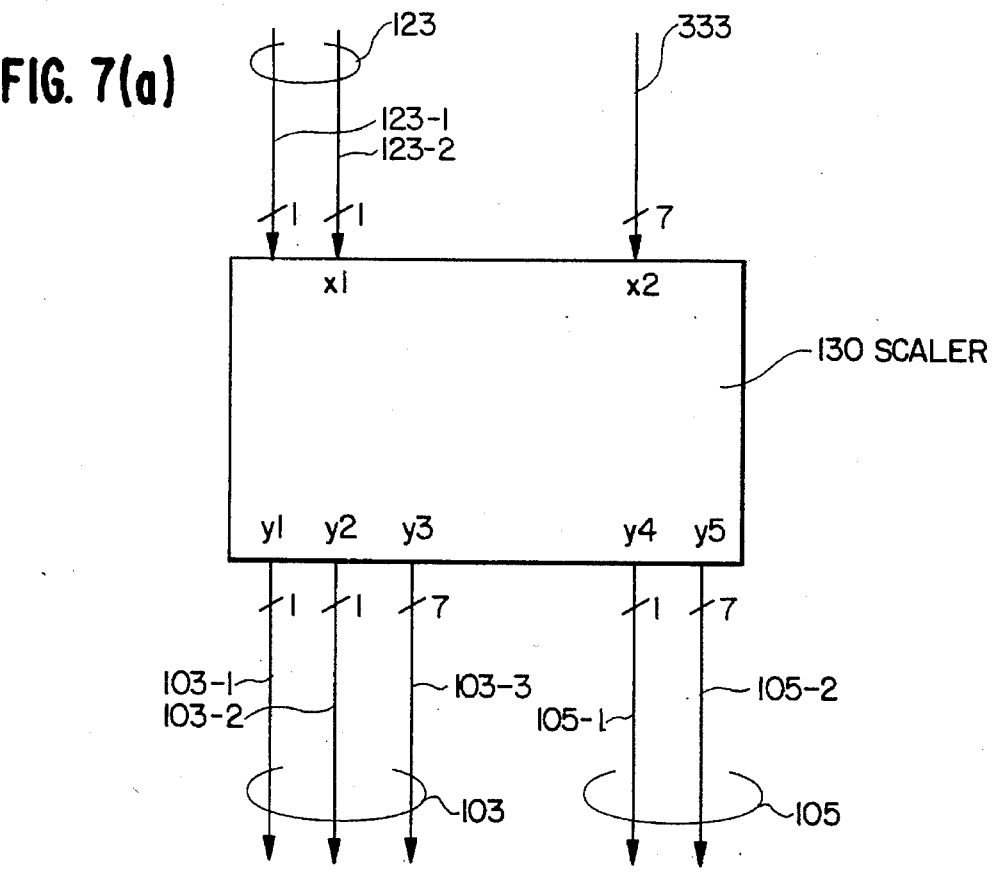
FIG. 7(a) is a diagram showing the connection of a scaler also included in the embodiment.
FIG. 7(b) is a table representative of a relation between the inputs and the outputs of the scaler.

To implement the above function, the scaler 130 sends signals over the signal lines 103 and 105 on the basis of a relation between inputs and outputs shown in FIG. 7(b). In the figure, |x2| is indicative of the absolute value of x2. While "0" is appearing on the signal line 123-1, the scaler 130 executes the above-stated function.

Figures 8A, 8B:
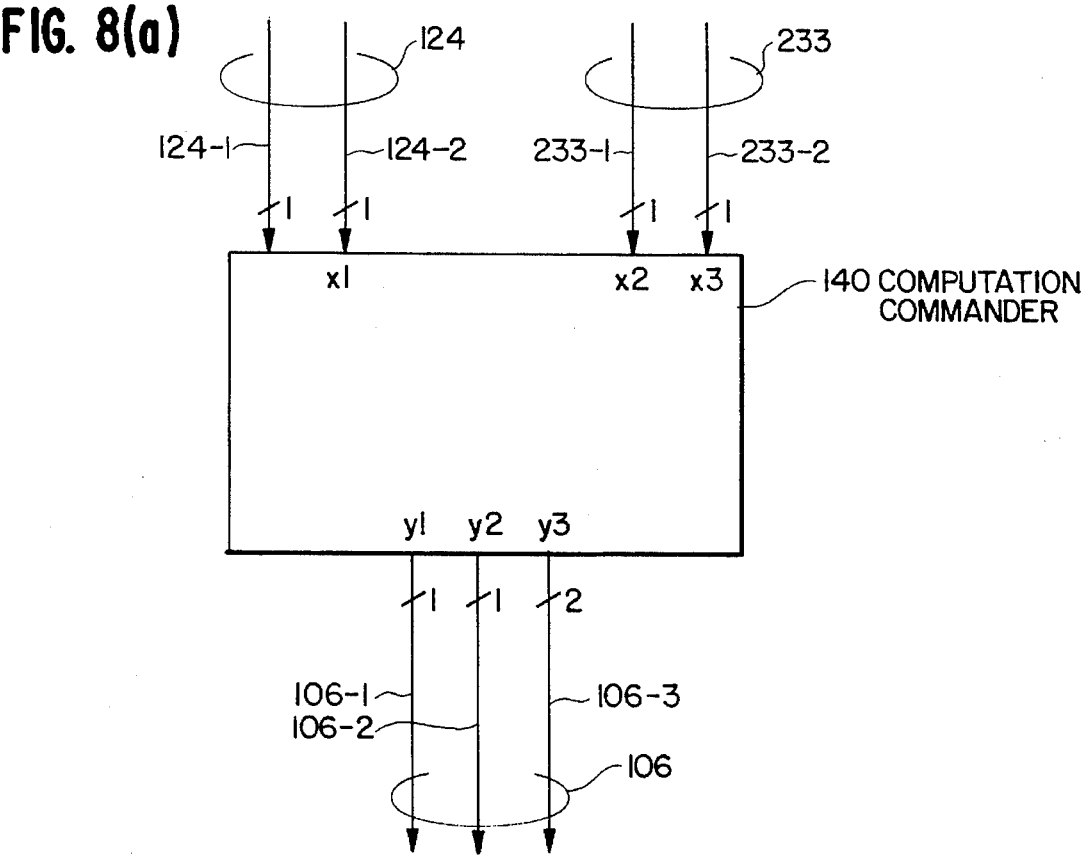
FIG. 8(a) is a diagram indicative of the connection of a computation commander also included in the embodiment.
FIG. 8(b) is a table representative of a relation between the inputs and the outputs of the computation commander.

Referring to FIG. 8(a), signal lines 124, 233 and 106 are connected to the computation commander 140. The signal lines 124 comprise 1-bit signal lines 124-1 and 124-2 and connect the controller 120 to the computation commander 140. An operation start command from the controller 120 is transferred to the computation commander 140 over the signal line 124-1. The signal lines 233 comprise 1-bit signal lines 233-1 and 233-2 and connect the sign processing circuit 230 to the computation commander 140. Further, the signal line 106 comprise 1-bit signal lines 106-1 and 106-2 and a 1-bit signal line 106-3 and connect the computation commander 140 to the mantissa computing circuit 600.

As the computation commander 140 receives the kind of computation over the signal line 124-2 and the signs of the first and second floating point data over the signal lines 233, it determines the kind of computation to be actually executed and then reports it to the mantissa computating circuit 600 over the signal lines 106. This function is used to compute a mantissa M.

To implement the above function, the computer commander 140 sends a signal over the signal lines 106 on the basis of a relation between inputs and outputs shown in FIG. 8(b). When the kind of operation received from a host is addition, "0" appears on the signal line 124-2; when it is subtraction, "1" appears on the line 124-2. The signs of the first and second floating point data are sent over the signal lines 233-1 and 233-2, respectively. When the signs of the first and second floating point data are identical, the computation commander 140 reports a kind of information identical with the kind received over the signal line 124-2 to the mantissa computing circuit 600 over the signal line 106-2. When the signs are different from each other, the computation commander 140 reports to the mantissa computing circuit 600 a kind of operation opposite to the kind received. That is, when the signs are different and the signal line 124-2 is indicative of addition, subtraction is reported to the computing circuit 600; when the line 124-2 is indicative of subtraction, addition is reported to the circuit 600.

Figures 9A, 9B:
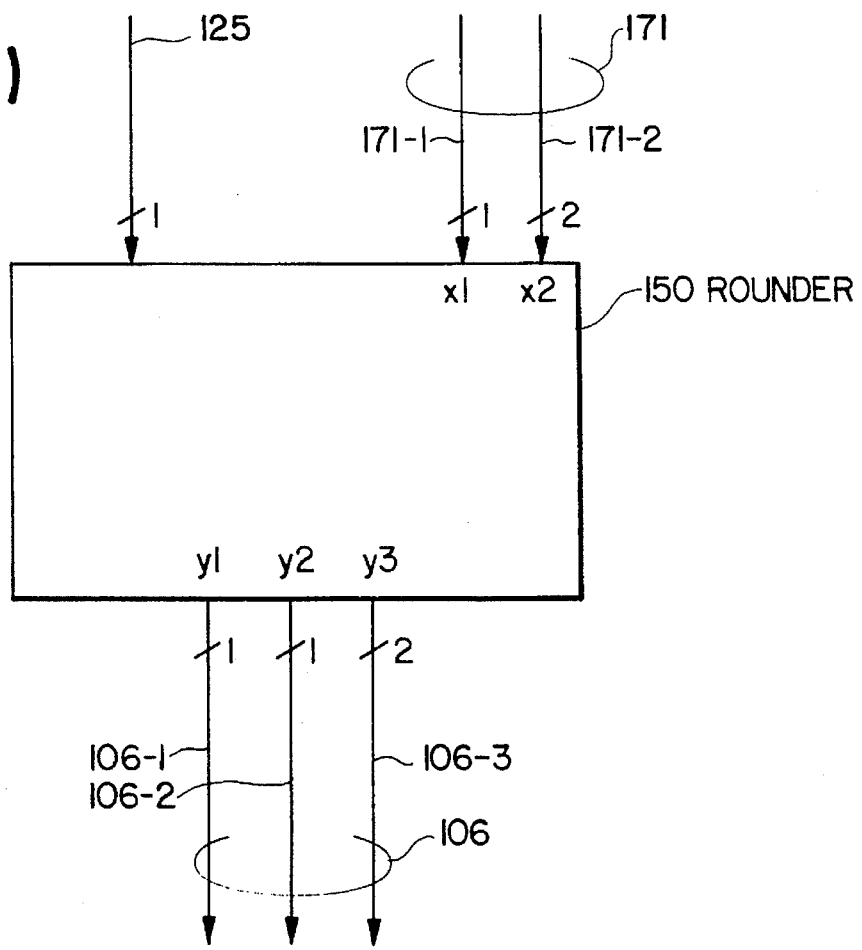
FIG. 9(a) is a diagram representative of the connection of a rounder also included in the embodiment.
FIG. 9(b) is a table representative of a relation between the inputs and the outputs of the rounder.

FIG. 9(a) shows the rounder 150 and input signal lines 125 and 171 and output signal lines 106 connected to the rounder 150. The signal line 125 connects the controller 120 to the rounder 150 and comprises a 1-bit signal line. An operation start signal from the controller 120 is sent to the rounder 150 over the signal line 125. The signal lines 171 connect the round and normalize data generator 170 to the rounder 150 and comprise a 1-bit signal line 171-1 and a 2-bit signal line 171-2.

As the rounder 150 receives the kind of rounding operation and the rounding constant generated by the data generator 170 over the signal lines 171, it reports them to the mantissa computing circuit 600 over the signal lines 106. This function is used to effect rounding.

FIG. 9(b) shows inputs and associated outputs on the basis of which the rounder 150 sends a signal to the mantissa computing circuit 600 via signal lines 106 to implement the above function.

As shown in FIG. 10(a), input signal lines 126 and 172 and output signal lines 103 and 105 are connected to the normalizer 106. The signal line 126 comprises a 1-bit signal line and connects the controller 120 to the normalizer 160. An operation start signal from the controller 120 is sent to the normalizer 160 over the signal line 126. The signal line 172 comprises a 4-bit signal line and connects the round and normalize data generator 170 to the normalizer 160.

When the normalizer 160 receives an amount of shift indicated by the round and normalize data generator 170 via the signal line 172, it reports the amount of shift to the shift computing circuit 500 over the signal line 105. This function is used to effect normalization.

FIG. 10(b) shows inputs and associated outputs on the basis of which the normalizer 160 sends signals to the signal lines 103 and 105 to implement the above function.

Figure 11A:
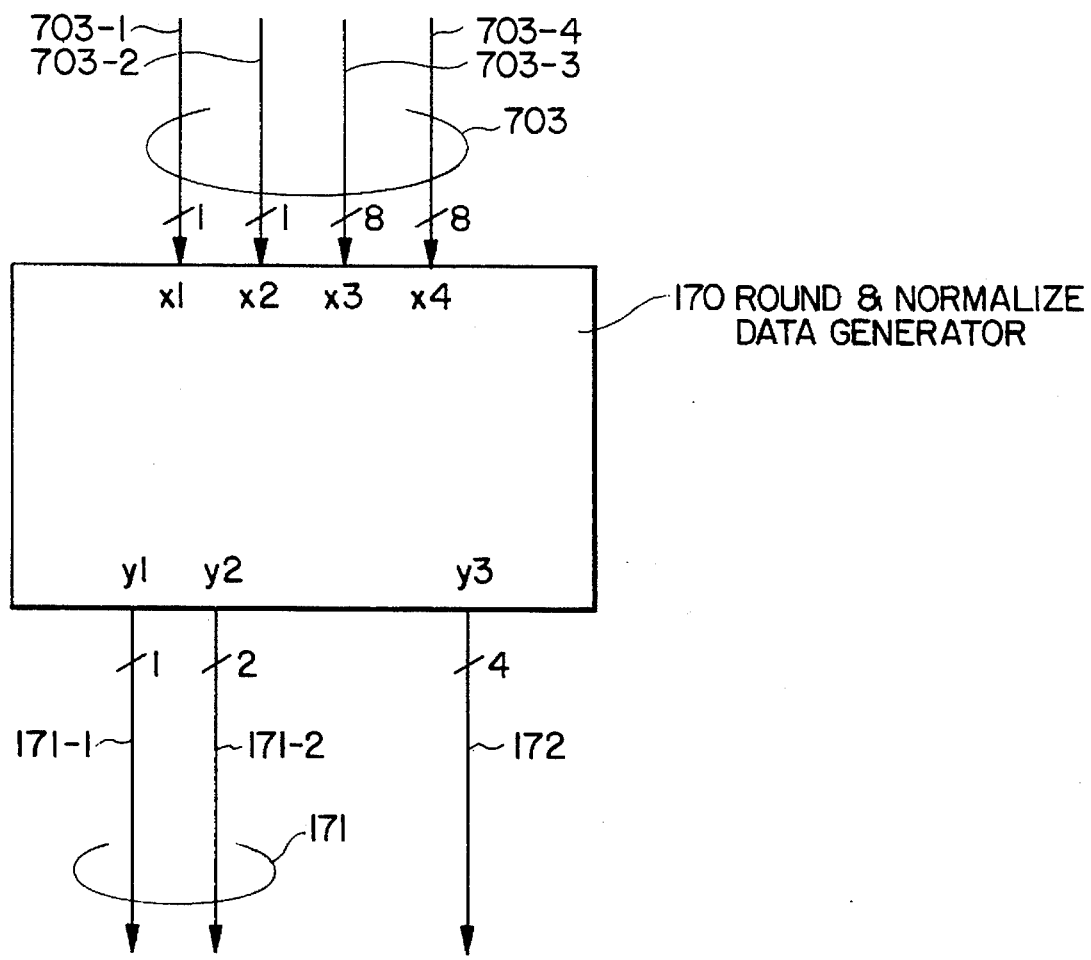
FIG. 11(a) is a diagram showing the connection of a round and normalize data generator also included in the embodiment.

Referring to FIG. 11(a), input signal lines 703 and output signal lines 171 and 172 are connected to the round and normalize data generator 170. The signal lines 703 comprise 1-bit signal lines 703-1 and 703-2 and 8-bit signal lines 703-3 and 703-4 and connect the detecting circuit 700 to the round and normalize data generator 170.

The round and normalize data generator 170 has two different functions, as follows. To begin with, as the data generator 170 receives the states of the bits of the first mantissa register 410 over the signal line 703, it generates the kind of rounding operation and a rounding constant matching the states of the bits and reports them to the rounder 150 via the lines 171. Also, the data generator 170 produces an amount of shift for normalization matching the states of the bits of the mantissa register 410 and sends it to the normalizer 160 over the signal line 172.

FIG. 11(b) shows inputs and associated outputs on the basis of which the round and normalize data generator 170 sends signals to the rounder 150 and the normalizer 160 via signal lines 171 and 172 to implement the above functions. When "00" is produced on the signal line 171-2, the rounding constant is 00000000H. When "01" is produced on the signal line 171-2, the rounding constant is 00000008H. Further, when "10" is produced on the signal line 171-2, the rounding constant is 00000080H. When "0" is delivered over the signal line 171-1, the kind of rounding operation is addition. In the case of addition, the rounding constant is added to the content of the first mantissa register 410, and the sum is set in the mantissa register 410. When "1" is produced on the signal line 171-1, the kind of rounding operation is subtraction; in which case the content of the mantissa register 410 is subtracted from the rounding constant, and the remainder is set in the mantissa register 410.

As shown in FIG. 11(b), the round and normalize data generator 170 is capable of generating various kinds of rounding operations, rounding constants and amounts of shift matching all the possible cases. In the figure, Cases 12 and 25 do not occur in actual computation. In Case 11, the result of computation is zero, and further processing is not required. Hence, when Case 11 occurs, an exceptional procedure is executed.

Figures 12A, 12B:
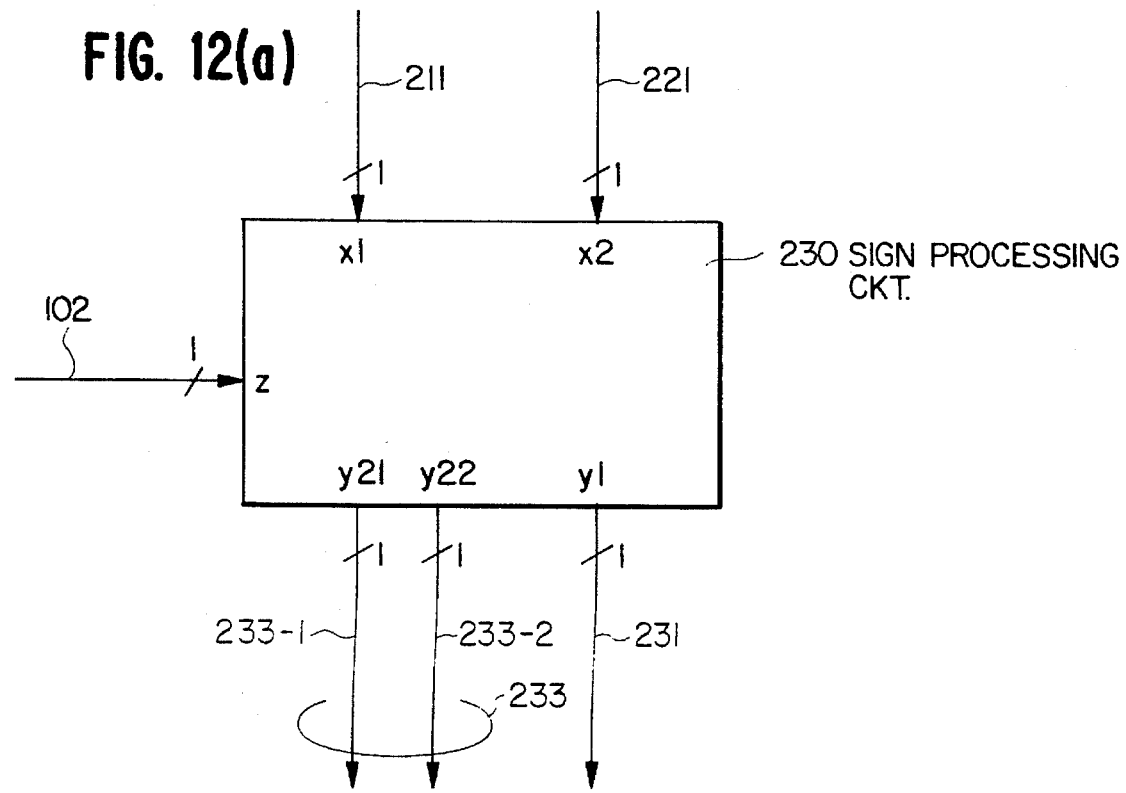
FIG. 12(a) is a diagram representative of the connection of a sign processing circuit also included in the embodiment.
FIG. 12(b) is a table representative of a relation between the inputs and the outputs of the sign processing circuit.

Referring to FIG. 12(a), input signal lines 102, 211 and 221 and output signal lines 231 and 233 are connected to the sign processing circuit 230. The signal line 102 is a 1-bit signal line and connects the controller 120 computation control circuit 100 to the sign processing circuit 230. The signal line 211 is a 1-bit signal line connecting the first sign register 210 to the processing circuit 230. The signal line 221 is a 1-bit signal line connecting the second sign register 220 to the sign processing circuit 230. The contents of the sign registers 210 and 220 are sent to the sign processing circuit 230 over the signal lines 211 and 221. The signal line 231 is a 1-bit signal line connecting the sign processing circuit 230 to the first sign register 220, and the sign processing circuit 230 sets the first sign register 210 via the signal line 231.

The sign processing circuit 230 functions to report the contents of the first and second sign registers 210 and 220 to the computation commander 140 of the computation control circuit 100 over the signal lines 233. Also, the sign processing circuit 230 functions to invert the content of the first sign register 210 in response to a signal received from the controller 120 of the computation control circuit 100 over the signal line 102.

FIG. 12(b) shows inputs and associated outputs on the basis of which the sign processing circuit 230 sends signals to the signal lines 233 and 231 to implement the above functions. As shown, when "0" is produced on the signal line 102, the processing circuit 230 inverts the content of the first sign register 210; when "1" is produced on the line 102, it reports the contents of the first and second sign registers 210 and 220 to the computation commander 140.

Figures 13A, 13B:
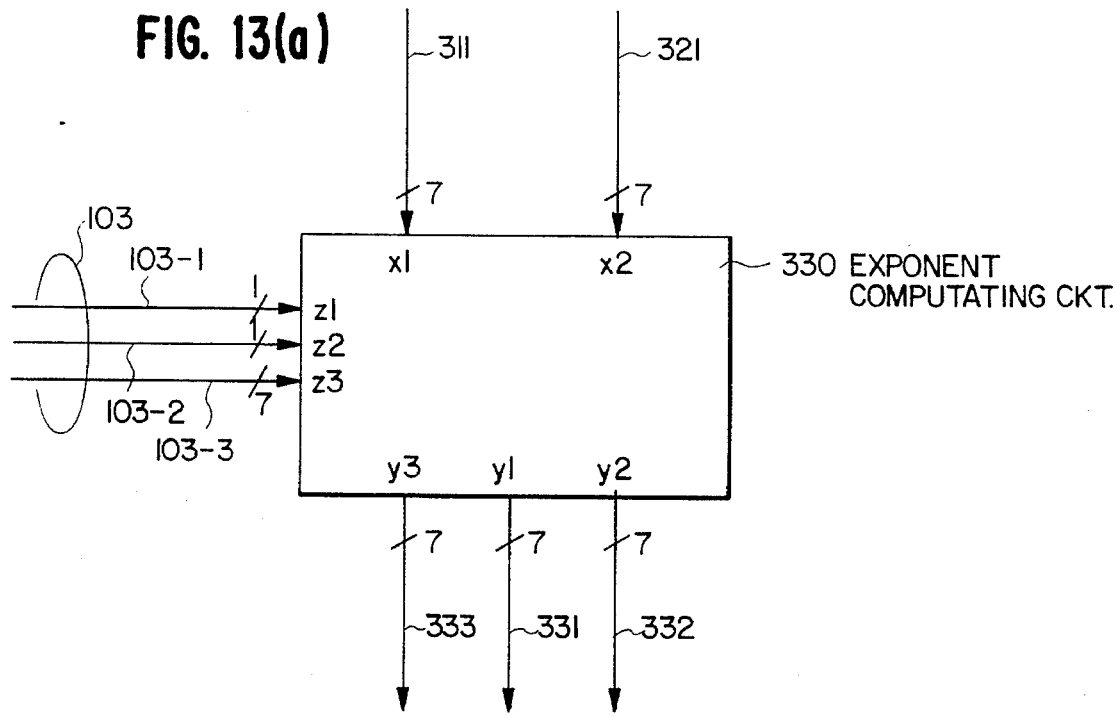
FIG. 13(a) is a diagram representative of the connection of an exponent computing circuit also included in the embodiment.
FIG. 13(b) is a table representative of a relation between the inputs and the outputs of the exponent computing circuit.

Referring to FIG. 13(a), signal lines 103, 311, 321, 333, 331 and 332 are connected to the exponent computing circuit 330. The signal line 311 is a 7-bit signal line connecting the first exponent register 310 to the exponential computing circuit 330. The signal line 321 is a 7-bit signal line connecting the second exponent register 320 to the exponential computing circuit 330. The contents of the exponent registers 310 and 320 are transferred to the exponential computing circuit 330 over the signal lines 311 and 321, respectively. The signal line 331 is a 7-bit signal line connecting the exponential computing circuit 330 to the first exponent register 310. The signal line 332 is a 7-bit signal line connecting the exponential computing circuit 330 to the second exponent register 320. The exponential computing circuit 330 sets the exponent registers 310 and 320 via the signal lines 331 and 332, respectively.

The exponential computing circuit 330 has two different functions, as follows. A first function is to add a number produced from the scaler 130 on the signal line 103-3 to the contents of the first and second exponent registers 310 and 320. This function is used in the event of scaling and normalization. A second function is to inform the scaler 130 of the computation control circuit 100 of a difference between the contents of the exponent registers 310 and 320 via line 333. This functions is used in the event of scaling.

FIG. 13(b) shows inputs and associated outputs on the basis of which the exponential computing circuit 330 send signals to the signal lines 331 to 333 to implement the above functions. Specifically, when "0" is produced on the signal line 103-1, the computing circuit 330 executes the above-stated first function; when "1" is produced on the line 103-1, it executes the second function.

Figures 14A, 14B:
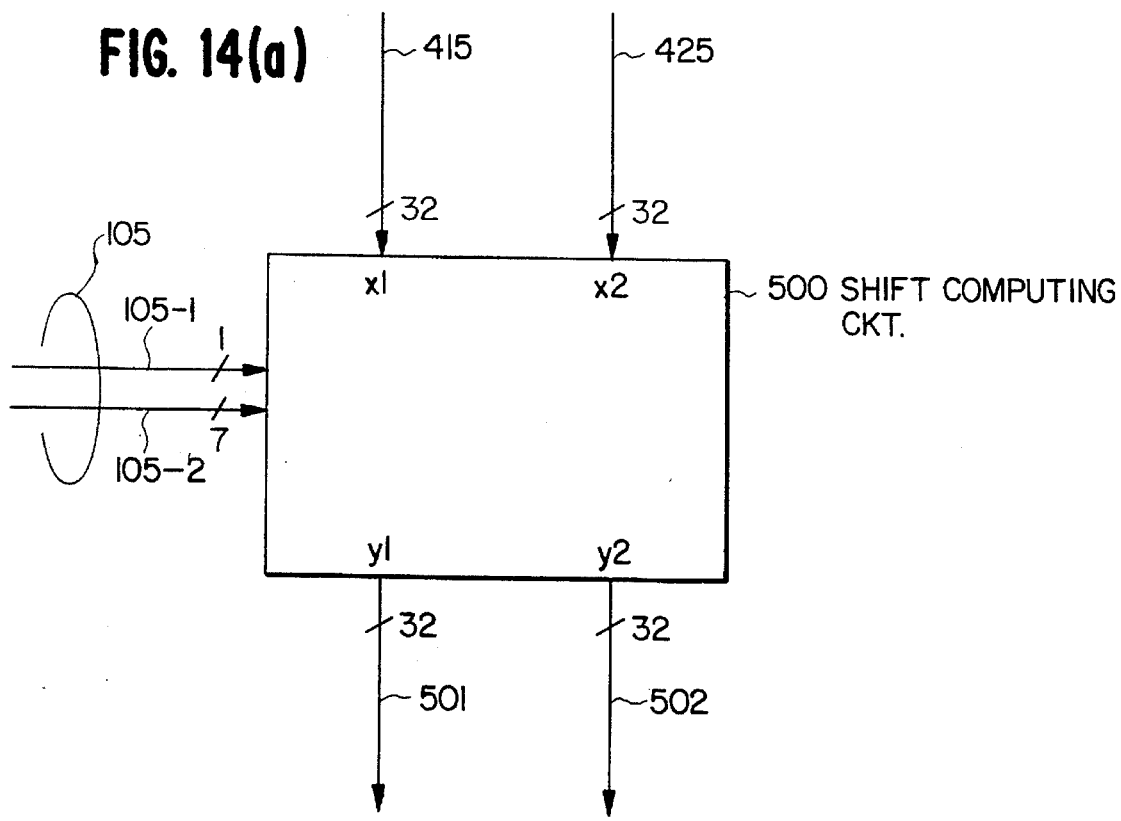
FIG. 14(a) is a diagram showing the connection of a shift computing circuit also included in the embodiment.
FIG. 14(b) is a table representative of a relation between the inputs and the outputs of the shift computing circuit.

Referring to FIG. 14(a), signal line 105, 415, 425, 501 and 502 are connected to the shift computing circuit 500. The signal lines 415 and 501 each comprises a 32-bit signal line and connects the first mantissa register 410 and shift computing circuit 500. The signal lines 425 and 502 each comprises a 32-bit signal line connecting the second mantissa register 420 and shift computing circuit 500. The contents of the mantissa registers 410 and 420 are transferred to the shift computing circuit 500 over the signal lines 415 and 425, respectively. The shift computing circuit 500 sets the mantissa registers 410 and 420 via the signal lines 501 and 502, respectively.

The shift computing section 500 selectively shifts the content of the first or second mantissa register 410 or 420 by the number of digits received over the signal line 105-2. This function is used to effect scaling and normalization.

FIG. 14(b) shows inputs and associated outputs on the basis of which the shift computing section 500 sends signals to the signal lines 501 and 502 to implement the above function. Specifically, when "0" is produced on the signal line 105-1, the computing section 500 shifts the first mantissa register 410; when "1" is produced on the line 105-1, it shifts the second mantissa register 420.

Figures 15A, 15B:
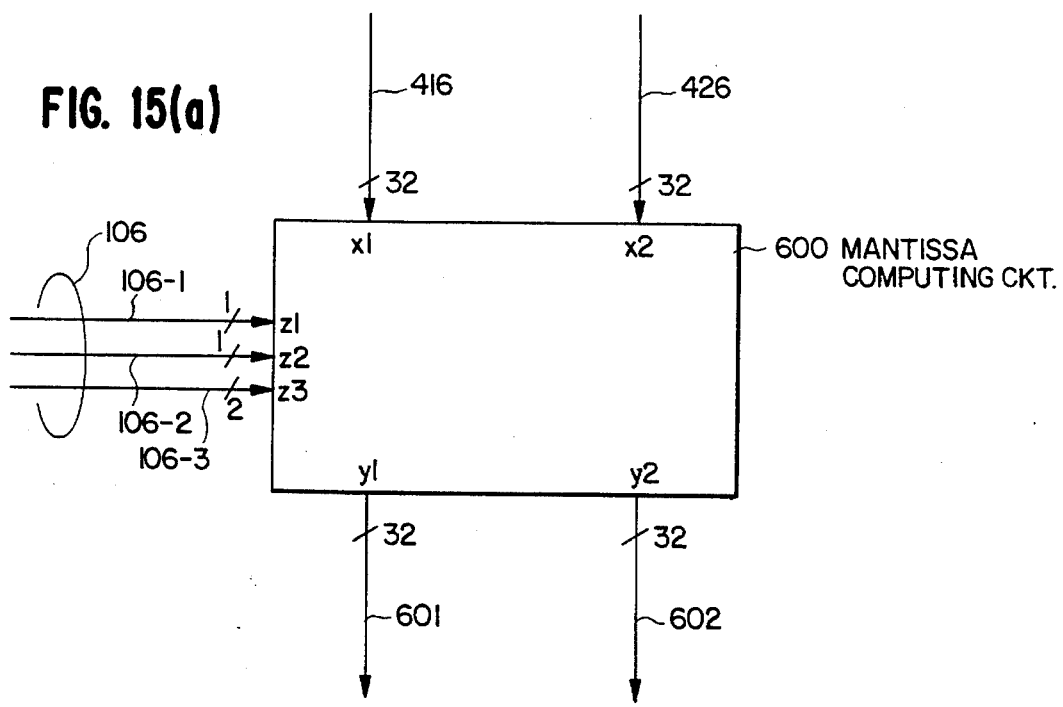
FIG. 15(a) is a diagram representative of the connection of a mantissa computing circuit also included in the embodiment.
FIG. 15(b) is a table representative of a relation between the inputs and the outputs of the mantissa computing section.

Referring to FIG. 15(a), signal lines 106, 416, 426, 601 and 602 are connected to the mantissa computing circuit 600. The signal lines 416 and 601 each comprises a 32-bit signal line connecting the first mantissa register 410 and the mantissa computing circuit 600. The signal lines 426 and 602 each comprises a 32-bit signal line connecting the second mantissa register 420 and the mantissa computing circuit 600. The contents of the mantissa registers 410 and 420 are transferred to the mantissa computing circuit 600 over the signal lines 416 and 426, respectively. The mantissa computing circuit 600 sets the mantissa registers 410 and 420 via the signal lines 601 and 602, respectively.

The mantissa computing circuit 600 has three different functions, as follows. A first function is to selectively effect addition or subtraction with the contents of the first and second mantissa registers 410 and 420 by referencing signals on the signal lines 106 and storing the result in the first mantissa register 410. This function is used in the event of addition or subtraction of the mantissa M. A second function is to add the rounding constant indicated by the signal on the signal line 106-3 to the content of the first mantissa register 410. A third function is to subtract the content of the first mantissa 410 from the rounding constant and store the resulting remainder in the first mantissa register 410. The second and third functions are used when the postprocessing of the mantissa M and rounding are executed at the same time.

FIG. 15(b) shows inputs and associated outputs on the basis of which the mantissa computing circuit 600 sends signals to the signal lines 601 and 602 to implement the above functions. Specifically, when "0" is produced on the signal line 106-1, the mantissa computing circuit 600 executes the above-stated first function. When "1" and "0" are respectively produced on the signal lines 106-1 and 106-2, the mantissa computing circuit 600 executes the second function. Further, when "1" is produced on both of the signal lines 106-1 and 106-2, the mantissa computing circuit 600 performs the third function. Regarding the second and third functions, the rounding constant to be added to the content of the first mantissa register 410 is specified by the signals on the lines 106. Specifically, when "00" is produced on the signal line 106-3, the rounding constant is 00000000H. When "01" is produced on the line 106-3, the rounding constant is 00000008H. Further, when "10" is produced on the line 106-3, the rounding constant is 00000080H.

Figure 16:
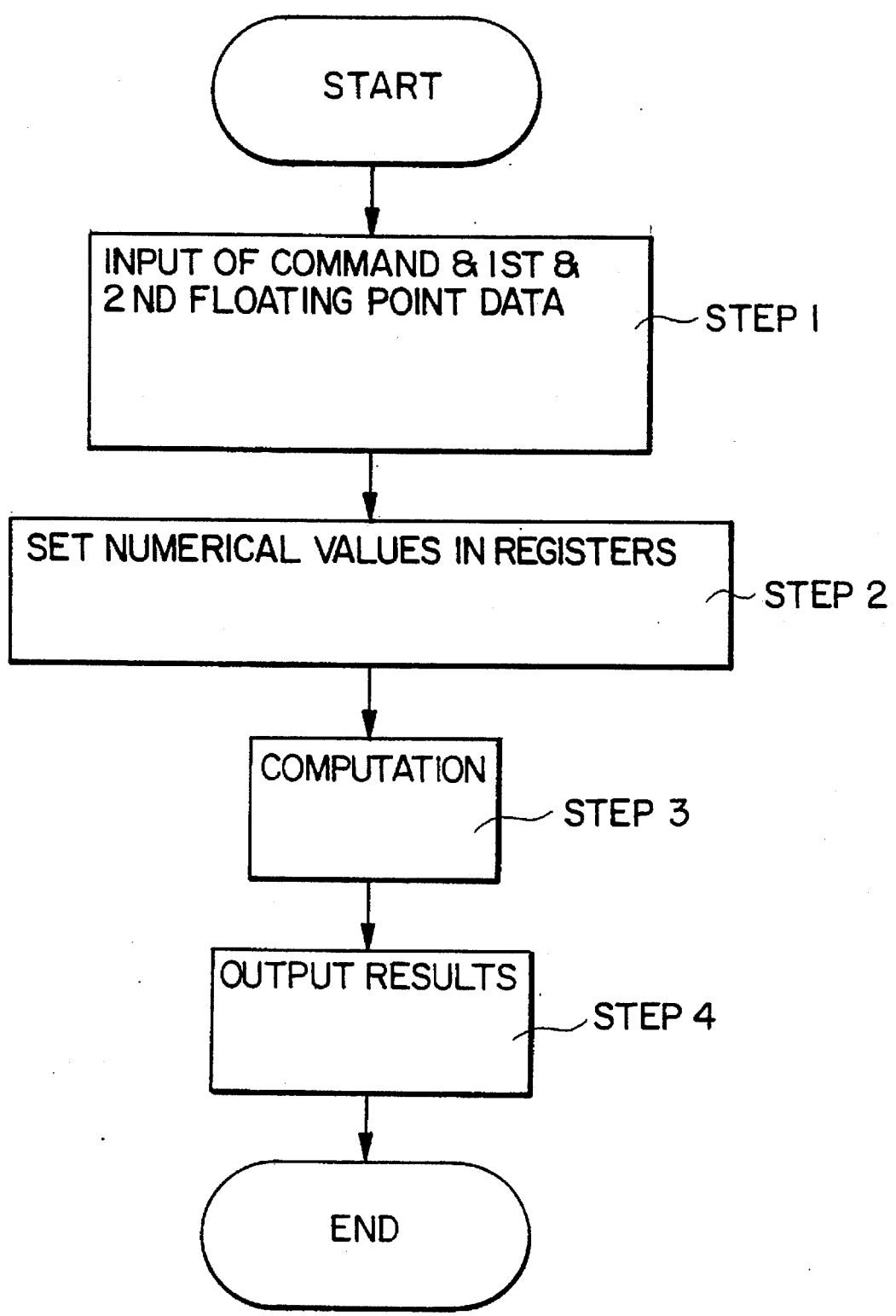
FIG. 16 is a flowchart demonstrating a specific operation of the embodiment.

Referring to FIG. 16, the operation of the illustrative embodiment is outlined in a flowchart. As shown, a command, first floating point data and second floating point data are input via the signal lines 1, 2 and 3, respectively (step 1). Then, the values of the first and second sign registers 210 and 220, first and second exponent registers 310 and 320, and first and second mantissa registers 410 and 420 are set (step 2). The step 2 is executed under the control of the computation control circuit 100, specifically a circuit included in the circuit 100, but not shown in FIG. 6. Subsequently, computation is executed (step 3). The results of computation are written to the first sign register 210, first exponent register 310, and first mantissa register 410. The results of computation are output over the signal line 4 (step 4).

A reference will be made to FIGS. 17 and 18 for describing the step 3 of FIG. 16 in detail on the assumption that the inversion of the sign does not occur. Specifically, the procedure of FIGS. 17 and 18 is assumed to compute 0.FFFFFFH×(16 xx 9)+0.100098H×(16 xx 9)=0.100001H× (16 xx 10), which is of the type not inverting the sign.

Figure 17:
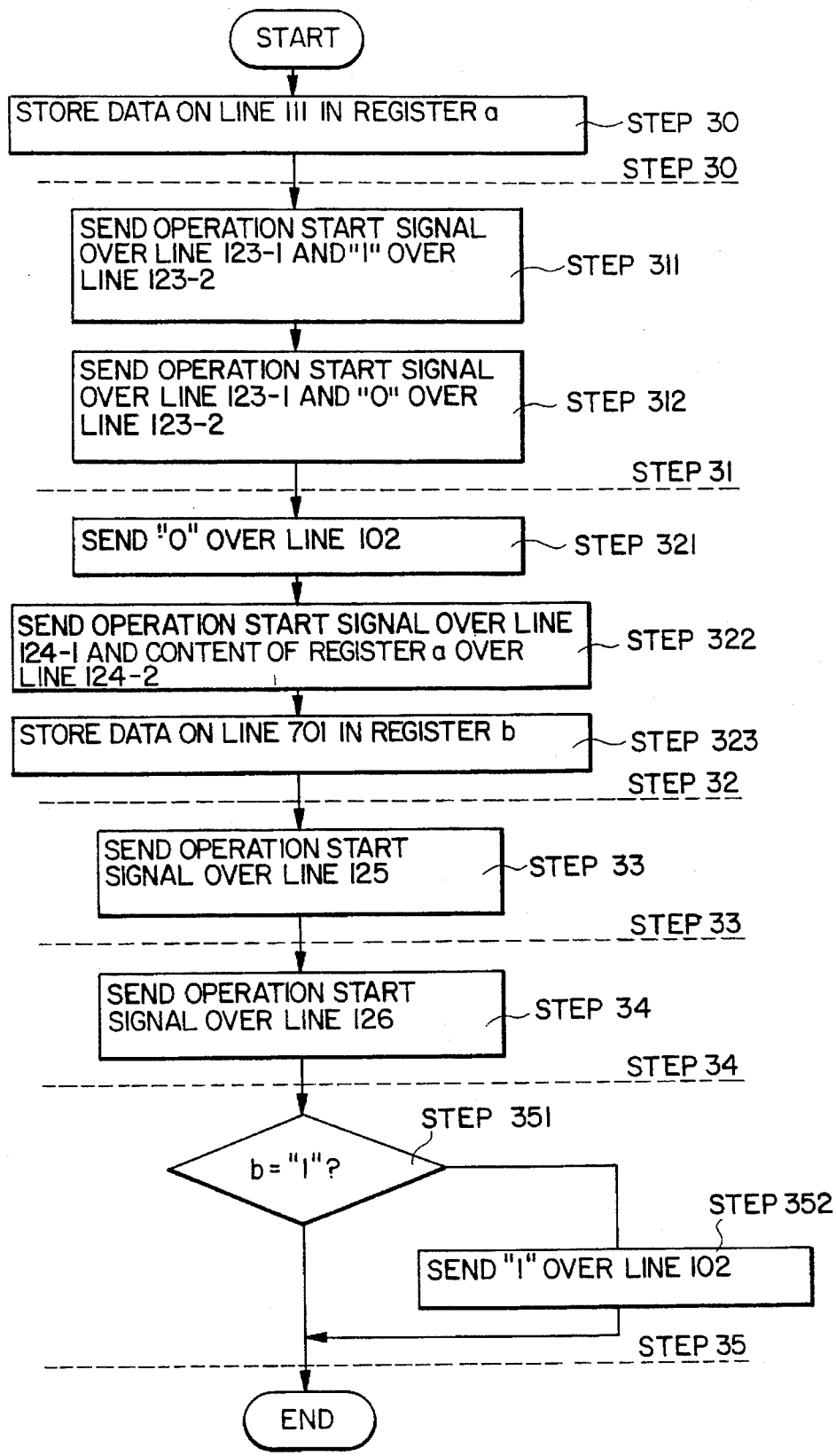
FIG. 17 is a flowchart representative of a specific operation of a controller also included in the embodiment.

FIG. 17 demonstrates the operation of the controller 120 and includes steps 30 to 35. As shown, in the step 31, the controller 120 executes scaling. The step 31 is made up of steps 311 and 312. The controller 120 computes a mantissa M in the step 32, executes rounding in the step 33, and then executes normalization in the step 34. The step 32 consists of steps 321, 322 and 323. The normalization corresponds to the conventional second normalization. In the step 35 (made up of steps 351 and 352), the controller 120 executes sign processing.

The illustrative embodiment is characterized in that not only the first normalization but also the postprocessing of a mantissa are omitted in the step 3 described above.

Figure 18:
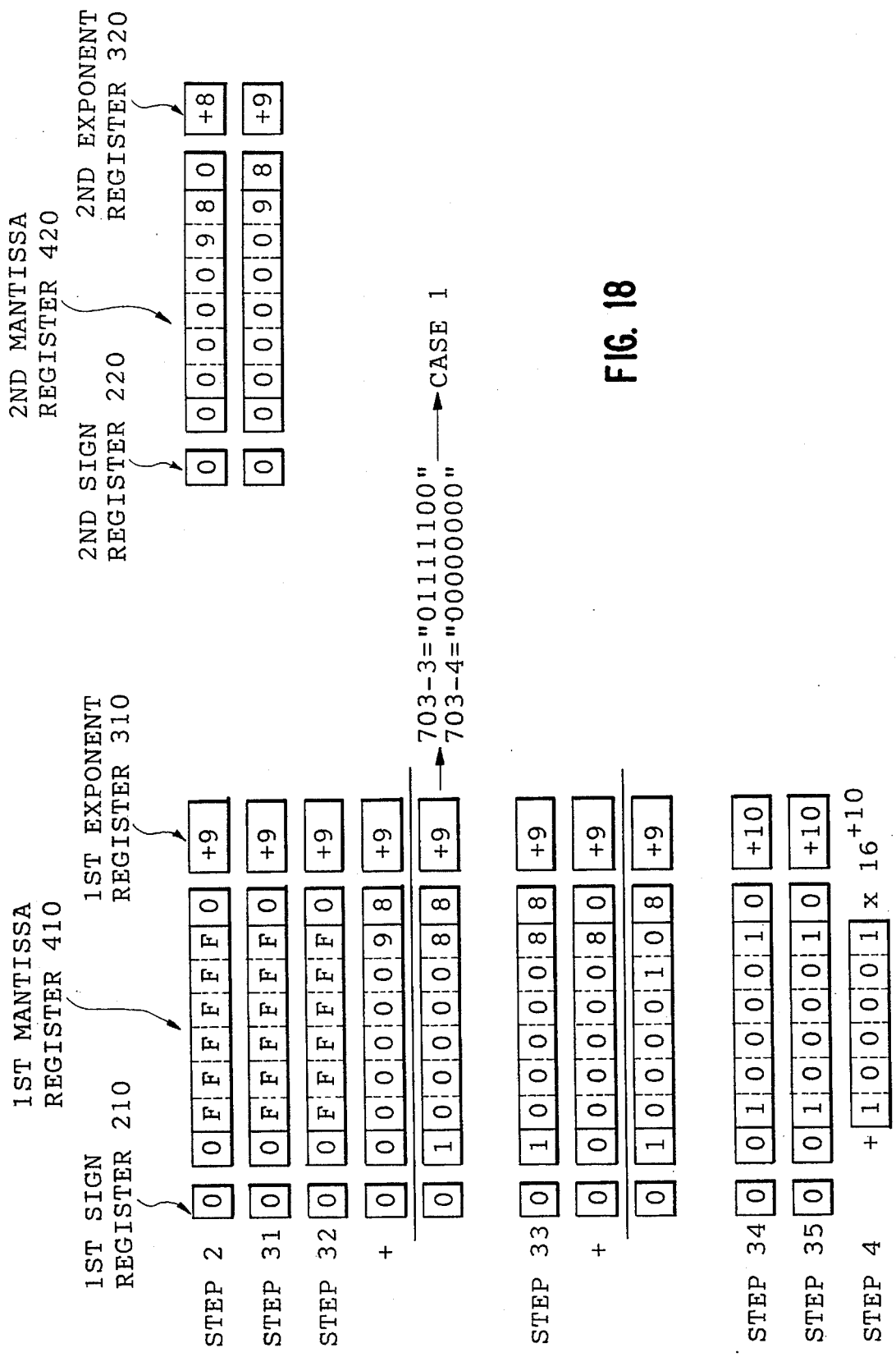
FIG. 18 shows specific changes in the contents of first and second mantissa registers further included in the embodiment and which occur during computation.

FIG. 18 shows the contents of the first and second mantissa registers 410 and 420. As shown, at the end of the step 2, the first sign register 210, first mantissa register 410 and first exponent register 310 have stored "0", 0FFFFFF0H, and +9, respectively. On the other hand, the second sign register 220, second mantissa register 420 and second exponent register 320 have stored "0", 00000980H, and +8, respectively.

Referring again to FIG. 17, in the step 311, the controller 120 produces an operation start signal on the signal line 123-1 to start up the scaler 130 and produces a "1" on the signal line 123-2 and the scaler 130 inputs "1" from line 123-2. Referring to FIG. 7(a), x1 is "1" in this case. Therefore, the scaler 130 sends "1" over the signal line 103-1 to the exponent computing circuit 330, as shown in FIG. 7(b). Referring to FIG. 13(a), the inputs to the exponent computing circuit 330 are as follows: z1 is "1", x1 is +9, and x2 is +8 in this condition. It follows that the exponent computing circuit 330 sends x1−x2=+1 on the signal line 333 to the scaler 130, as shown in FIG. 13(b).

In the step 312, FIG. 17, the controller 120 delivers an operation start signal over the signal line 123-1 to start up the scaler 130 and produces a "0" on the signal line 123-2. Referring to FIG. 7(a), the inputs to the scaler 130 are as follows: x1 is "0" and x2 is +1 in this case As shown in FIG. 7(b), x2=+1>0 holds. Hence, the scaler 130 sends a "0" on the signal line 103-1, "1" on the signal line 103-2, and +1 on the signal line 103-3 to the exponent computing circuit 330. Referring to FIG. 13(a), the inputs to the exponent computing circuit are now as follows: z1 is "0", z2 is "1", and z3 is +1. Consequently, as shown in FIG. 13(b), the exponent computing circuit 330 sets (+8)+(+1)=+9 in the first exponent register 310.

At the same time, the scaler 130 sends "1" over the signal line 105-1 and |x2|=+1 over the signal line 105-2 to the shift computing circuit 500, as shown in FIG. 7(b). In this case, the inputs to the shift computation circuit 500 are as follows: z1 is "1", z2 is +1, and x2=00000980H, as shown in FIG. 14(a). As a result, the shift computing circuit 500 sets the content of the second mantissa register 420 via the signal line 502. Specifically, the second mantissa register 420 (00000980H) is shifted to the right by z2=+1, and the value 00000980H digit is set in the register 420.

FIG. 18 shows the conditions of the first and second mantissa registers 410 and 420 occurring at the end of the step 31.

As shown in FIG. 17, in the step 321, the controller 120 delivers "0" over the signal line 102 to the sign processing circuit 230 and the first sign register 210 and the second sign register 220 respectively send the sign bits over lines 211 and 212. In this case, the inputs to the signal processing circuit 230 are as follows: z is "0", x1 is "0", and x2 is "0", as shown in FIG. 12(a). Hence, as shown in FIG. 12(b), the sign processing circuit 230 sends "0" over the signal line 233-1, and sends "0" on the signal lines 233-2 to the computation commander 140.

In the step 322 of FIG. 17, the controller 120 sends an operation start signal over the signal line 124-1 to start up the computation commander 140. At the same time, the content of a register a is sent over the signal line 124-2. In this case, "0" is sent over the signal line 124-2 because an addition command is being performed. Referring to 8(a), the inputs to the computation commander 140 are as follows: x1 is "0", x2 is "0", and x3 is "0" in this case Consequently, as shown in FIG. 8(b), the computation commander 140 sends "0" over the signal line 106-1 and "0" over the signal line 106-2 to the mantissa computing circuit 600. Referring to FIG. 15(a), the inputs to the mantissa computing circuit 600 are as follows: z1 is "0", z2 is "0", x1 is 0FFFFFF0H, and x2=is 00000098H. Hence, as shown in FIG. 15(b), the mantissa computing section 600 sets x1+x2= 10000088H in the first mantissa register 410 via the signal line 601.

In the step 323, FIG. 17, the controller 120 stores the signal from the detecting circuit 700 on the signal line 703-1 in a register b. In this case, "0" is stored in the register b.

Figure 5A:
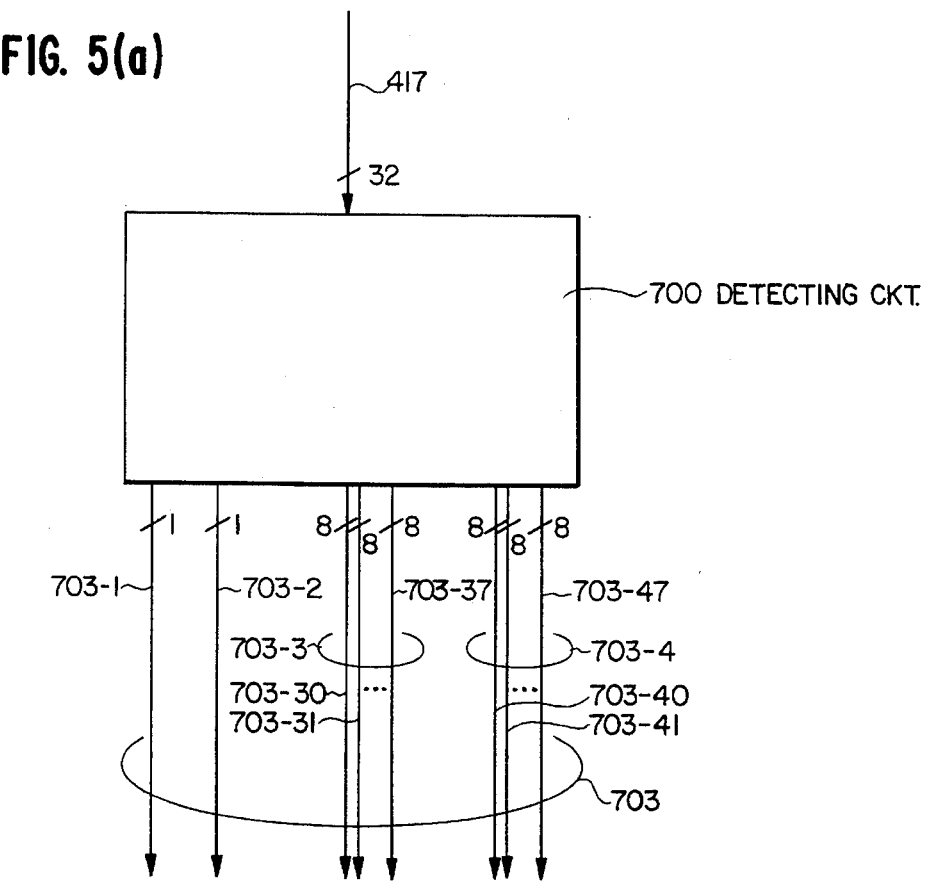
FIG. 5(a) is a diagram representative of the connection of a detecting circuit included in the embodiment.
Figure 5B:
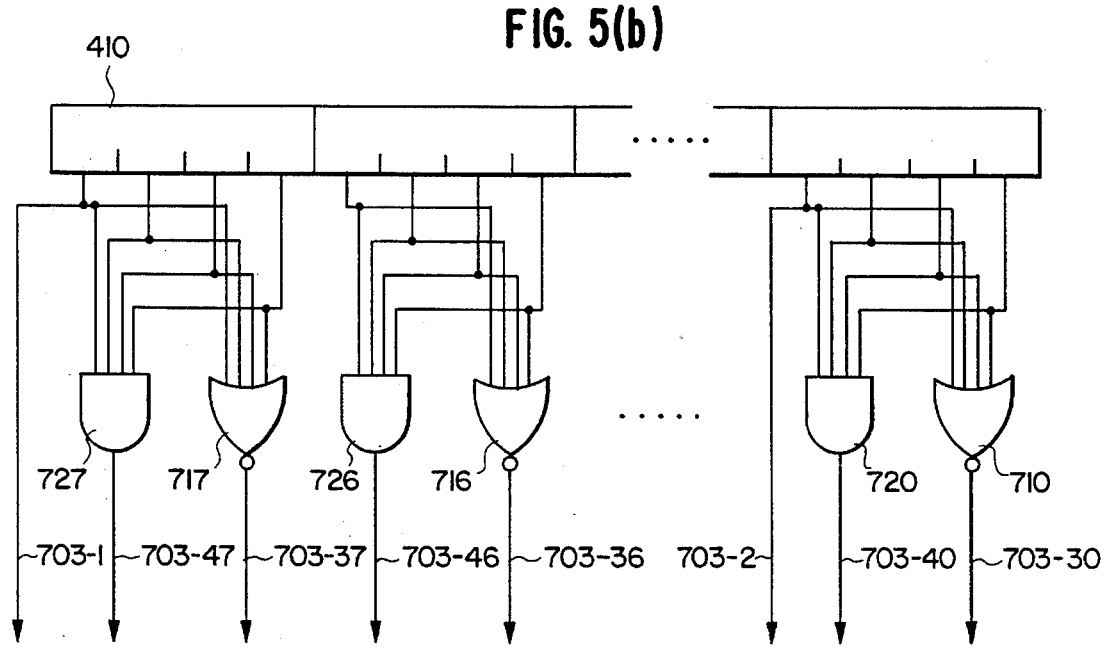
FIG. 5(b) is a circuit diagram representative of an arrangement incorporated in the detecting circuit.

The condition of the first mantissa register 410 at the end of the step 32 is shown in FIG. 18. Referring to FIGS. 18, 5(a) and 5(b), the detecting circuit 700 sends "0" over the signal line 703-1, "1" over the signal line 703-2, "01111100" over the signal line 703-3, and "00000000" over the signal line 703-4. Referring to FIG. 11(a), the inputs to the round and normalize generator 170 are as follows: x1 is "0", x2 is "1", x3 is 01111100" and x4 is "00000000" in this case. This corresponds to Case 1 shown in FIG. 11(b). Consequently, the round and normalize data generator 170 sends "0" over the signal line 171-1 and "10" over the signal line 171-2 to the rounder 150, and sends +1 over this signal line 172 to the normalizer 160.

In the step 33 of FIG. 17, the controller 120 sends an operation start signal over the signal line 125 to start up the rounder 150. Referring to FIG. 9(a), the inputs to the rounder 150 are as follows: x1 is "0", and x2 is "10" in this case. As a result, the rounder 150 sends "1" over the signal line 106-1, "0" over the signal line 106-2, and x3–"10" over the signal line 106-3 to the mantissa computing circuit 600. Referring to FIG. 15(*a*), the inputs to the mantissa computing circuit 600 are as follows: z1 is "1", z2 is "0", z3 is "10", and x1 is 10000088H. Hence, as shown in FIG. 15(*b*), the mantissa computing circuit 600 sets x1+00000080H=1 0000108H in the first mantissa register 410 via the signal line 601.

In the step 34 of FIG. 17, the controller 120 sends an operation start signal over the signal line 126 to start up the normalizer 160. Also, the round and normalize data generator 170 outputs a "+1" on line 172 to the normalizer 160. Thus, referring to FIG. 10(*a*), the inputs to the normalizer 160 are as follows: x is +1 in this case. Hence, as shown in FIG. 10(*b*), the normalizer 160 sends "0" on the signal line 103-1, "0" on the signal line 103-2, and x=+1 on the signal line 103-3 to the exponent computing circuit 330. Referring to. FIG. 13(*a*), the inputs to the exponent computing circuit 330 are as follows: z1 is "0", z2 is "0", z3 is +1, and x1 is +9 in this case. Consequently, the exponent computing circuit 330 sets x1+z3=+10 in the first exponent register 310, as shown in FIG. 13(*b*).

Further, in the step 34, the normalizer 160 respectively sends "0" and x=+1 on the signal lines 105-1 and 105-2 to the shift computing circuit 500. Referring to FIG. 14(*a*), the inputs of the shift computing circuit 500 are as follows: z1 is "0", z2 is +1, and x1 is 10000108H in this case. Hence, the shift computing circuit 500 sends data representative of x1 shifted one digit to the right over the signal line 501 to the first mantissa a register 410. As a result, the content of the first mantissa register 410 is shifted one digit to the right, resulting in 01000010H.

The content of the first mantissa register 410 after the step 34 is shown in FIG. 18.

In the step 351 of FIG. 17, the value of b is determined. In this case, since b is "0", the operation of the controller 120 ends.

Referring to FIG. 18, in the step 4, the results of computation stored in the first sign register 210, first exponent register 310 and first to sixth digits of the first mantissa register 410 are sent over the signal line 4.

A reference will be made to FIGS. 17 and 19 for describing a specific operation of the embodiment occurring when the inversion of the sign occurs. Specifically, the procedure to be described is assumed to compute 0.800000H×(16 xx 2)+−0.100001H×(16 xx 8)=−0.100001H×(16 xx 8) in the step 3.

Figure 19:
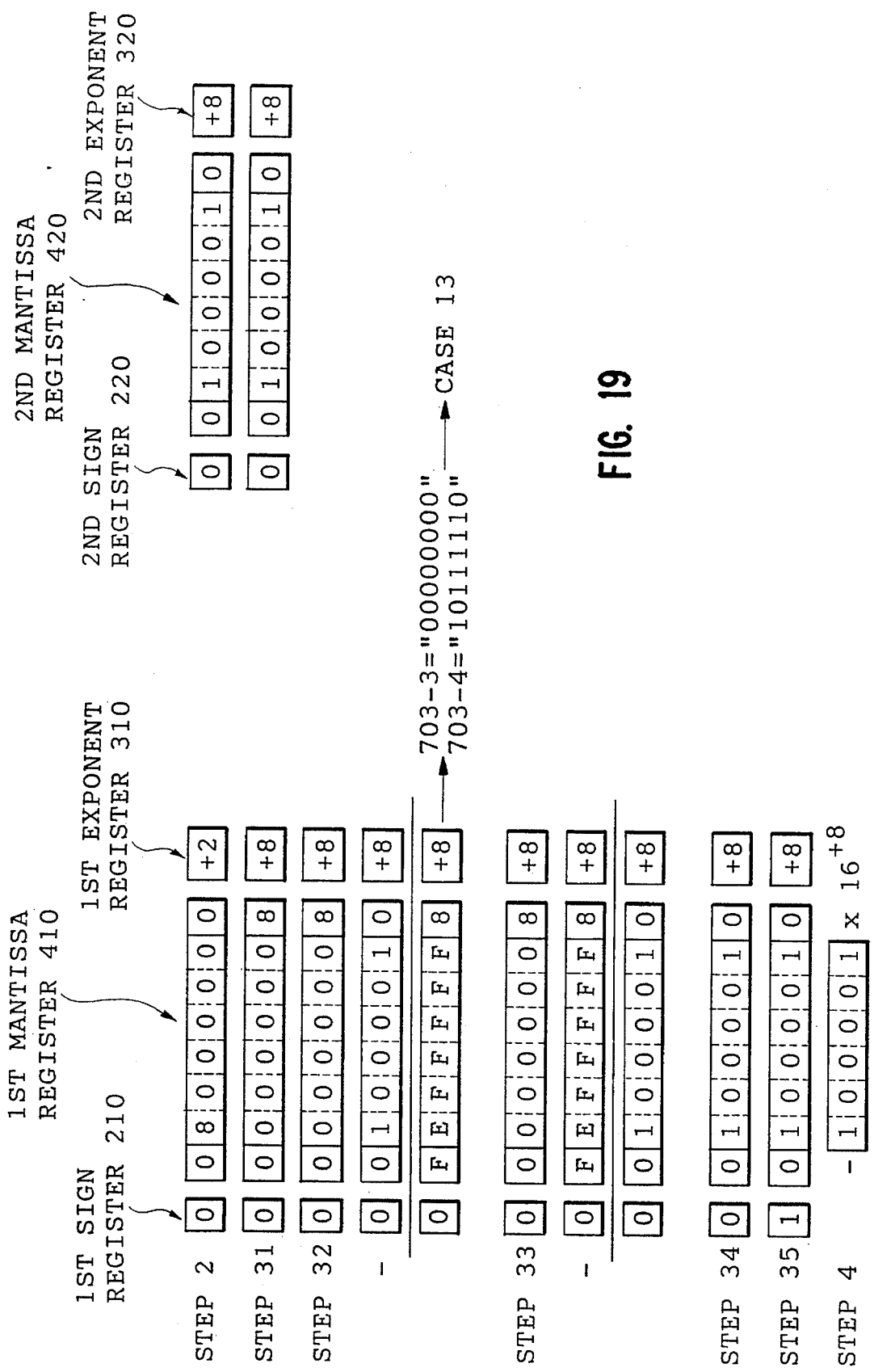
FIG. 19 also shows specific changes in the contents of the first and second mantissa registers.

FIG. 19 shows the contents of the first and second mantissa registers 410 and 420 held at the end of the step 2. As shown, the first sign register 210, first mantissa register 410 and first exponent register 310 respectively store "0", 0800000H and +2. On the other hand, the second sign register 220, second mantissa register 420 and second exponent register 320 respectively store "0", 01000010H, and +8.

In the step 30 of FIG. 17, the controller 120 stores the signal on the signal line 111 in the register a. At this instant, a subtraction command has been delivered over the signal line 3. Hence, "1" is stored in the register a.

In the step 311 of FIG. 17, the controller 120 sends an operation start signal over the signal line 123-1 to start up the scaler 130. At the same time, "1" is produced on the signal line 123-2. Referring to FIG. 7(*a*), the inputs of the scaler 130 are as follows: x1 is "1" in this case. Therefore, the scaler 130 sends "1" over the signal line 103-1 to the exponent computating circuit 330, as shown in FIG. 7(*b*). Referring to FIG. 13(*a*), the inputs to the exponent computing circuit: 330 are as follows: z1 is "1", x1 is +2, and x2 is +8 in this case Hence, the exponent computing circuit: 330 delivers x1−x2=−6 over the signal line 333 to the scaler 130 as shown in FIG. 13(*b*).

In this step 312 of FIG. 17, the controller 120 sends an operation start signal over the signal line 123-1 to start up the scaler 130. At the same time, "0" is produced on the signal line 123-2. Referring to FIG. 7(*a*), the inputs to the scaler 130 are as follows: x1 is"0", x2 is −6 in this case. As shown in FIG. 7(*b*), x2=−6<0 holds. Consequently, the scaler 130 sends "0" over the signal line 103-1, "0" over the signal line 103-2, and |x2|=+6 over the signal line 103-3 to the exponent computing circuit 330. Referring to FIG. 13(*a*), the inputs to the exponent computing circuit 330 are as follows: z1 is "0", z2 is "0", and z3 is +6 in this case Hence, the exponent computing circuit 330 sets (+2)+(+6)=+8 in the first exponent register 310 via the signal line 331, as shown in FIG. 13(*b*).

At the same time, referring again to FIG. 7(*a*), the scaler 130 sends "0" and |x2|=+6 over the signal lines 105-1 and 105-2, respectively, to the shift computing circuit 500. Referring to FIG. 14(*a*), the inputs to the shift computing circuit 500 are as follows: z1 is "0", z2 is +6, and x1 is 08000000H in this case. Hence, the shift computing circuit 500 sets the content of the first mantissa register 410 via the signal line 502. In this case x1 is shifted z2=+6 digits to the right and 00000008H is set in the register 410.

FIG. 18 shows the conditions of the first and second mantissa registers 410 and 420 held at the end of the step 31.

In the step 321 of FIG. 17, the controller 120 sends "0" on the signal line 102 to the sign processing unit 230. Referring to FIG. 12(*a*), the inputs to the sign processing unit 230 are as follows: z is "0", x1 is "0", and x2="0" in this case. Therefore, the sign processing circuit 230 sends x1="0", which is the content of the first sign register 210, over the signal line 233-1. At the same time, the sign processing unit 230 sends x2="0", which is the content of the second sign register 220, over the signal line 233-2.

In the step 322 of FIG. 17, the controller 120 sends an operation start signal over the signal line 124-1 to start up the computation commander 140. At the same time, the content of the register a from the decoder 110 is delivered over the signal line 124-2. Referring to FIG. 8(*a*), the inputs for the computation commander 140 are as follows: x1 is "1", x2 is "0" and x3 is "0". Therefore, the computation commander 140 delivers "0" and "1" over the signal lines 106-1 and 106-2, respectively, to the mantissa computing circuit 600. Thus, as shown in FIG. 15(*a*) the inputs of the mantissa computing circuit 600 are as follows: z1 is "0", z2 is "1", x1=00000008H, and x2 is 01000010H It follows that the mantissa computing circuit 600 sets x1−x2=FEFFFFF8 in the first mantissa register 410 via the signal line 601.

In the step 323 of FIG. 17, the detecting circuit 700 sends a signal on the signal line 703-1 and the controller 120 stores the signal in the register b. In this case, "1" is stored in the register b.

The condition of the first mantissa register 410 at the end of the step 323 is shown in FIG. 19. Referring to FIGS. 19, 5(*a*) and 5(*b*), the detecting circuit 700 sends "00000000" and "10111110" over the signal lines 703-3 and 703-4, respectively, to the round and normalizer data generator 170. Referring to FIG. 11(*a*), the inputs to the round and normalize data generator 170 are as follows: x1 is "1", x2 is "1", x3 is "00000000", and x4 is "10111110". This corresponds to Case 13 shown in FIG. 11(*b*). Consequently, the round and normalize data generator 170 sends "1" on the signal line 171-1, "01" on the signal line 171-2 to the rounder 150, and sends "0" on the signal line 172 to the normalizer 160.

In the step 33 of FIG. 17, the controller 120 sends an operation start signal over the signal line 125 to start up the rounder 150. Referring to FIG. 9(a) the inputs to the rounder are as follows: x1 is "1", and x2 is "01" in this case Hence, the rounder 150 delivers "1" over the signal line 106-1, x1="1" over the signal line 106-2, and x2="01" over the signal line 106-3 to the mantissa computing circuit 600. Referring to FIG. 15(a), the inputs to the mantissa computing circuit 600 are as follows: z1 is "1", z2 is "1", z3 is "01" and x1 is FEFFFFF8H Consequently, the mantissa computing circuit 600 sets 00000008H−x1=01000010H is the first mantissa register 410 via the signal line 601. By such an operation, the sign of x1 is inverted with the result that the content of the mantissa M is converted to a positive number. Also, on the least significant digit, the content of x1 is subtracted from the hexadecimal 8H (i.e., rounding is executed at the same time). As a result, the postprocessing of the mantissa M and the rounding operation are effected at the same time in the step 33.

In the step 34 or FIG. 17, the controller 120 sends an operation start signal over the signal line 126 to start up the normalizer 160 and the round and normalize data generator 170 sends "0" over line 172 to the normalizer 160. Referring to FIG. 10(a), the input x of the normalizer 160 is 0 in this case. Hence, the normalizer 160 sends "0" over the signal line 103-1, "0" over the signal line 103-2, and x=0 over the signal line 103-3 to the exponent computing circuit 330, as shown in FIG. 10(b). Referring to FIG. 13(a), the inputs to the exponent computing circuit 330 are as follows: z1 is "0", z2 is "0", z3 is "0", and x1=+8 As a result, the exponent computing circuit 330 sets x1+z3=+8 in the first exponents register 310 via the signal line 331, as shown in FIG. 13(b).

In the step 34 of FIG. 17, the normalizer 160 sends a "0" on the signal line 105-1 and x=0 on the signal line 105-2 (as shown in FIG. 10(b)) to the shift computing circuit 500. Referring to FIG. 14(a), the inputs to the shift computing circuit 500 are as follows: z1 is "0", z2 is 0, and x1 is 01000010H. As a result, the shift computing circuit 500 delivers data resulted from the rightward shift of x1 by zero digits over the signal line 501, as shown in FIG. 14(b). In this condition, no substantial processing occurs (i.e., the content 01000010H of the first mantissa register 410 does not change).

In the step 351 of FIG. 17, the value of b is determined In this case, since b is "1", the step 352 is executed.

In the step 352 of FIG. 17, "1" is produced by the controller 120 on the signal line 102 and sent to the sign processing circuit 230. Referring to FIG. 12(a), the inputs of the sign processing circuit 230 are as follows: z is "1" and x1 is "0" (i.e., the value of the first sign register 210) in this case. Hence, referring to FIG. 212(b), the sign processing circuit 230 sets "1", (i.e., the inverted version of x1) in the first sign register 210 via the signal line 231.

In the step of FIG. 18, the results of computation stored in the first sign register 210, first exponent register 310 and first to sixth digits of the first mantissa register 410 are sent over the signal line 4.

In summary, the illustrative embodiment executes the postprocessing of a mantissa and the rounding operation at the same time. This allows not only the first normalization but also the postprocessing of a mantissa to be omitted, thereby promoting rapid operations.

Various modifications will become possible for those skilled in the art after receiving the teachings of the present disclosure without departing from the scope thereof. For example, a negative number may be represented by a complement other than 2's complement used in the embodiment. Then, the relation between the inputs and the outputs of the round and normalize data generator 170 shown in FIG. 11(b) will be changed. Although the embodiment has been shown and described in relation to an addition/subtraction type computer, it is similarly applicable to any other type of computer. Then, the relation between the inputs and the outputs of the round and normalize data generator 170 shown in FIG. 11(b) will also be changed.

What is claimed is:

1. A floating point computing device which determines a resultant floating point number of an arithmetic operation, said floating point computing device comprising:

a mantissa register for storing at least a mantissa of a floating point number, wherein said mantissa register is capable of storing a plurality of digits and wherein said plurality of digits forms a mantissa numeral;

first detecting means for detecting whether all bits of at least one of said plurality of digits of said mantissa numeral are 0 or not;

second detecting means for detecting whether all bits of at least one of said plurality of digits of said mantissa numeral are 1 or not;

positive detecting means for detecting whether said mantissa numeral stored in said mantissa register is positive or not; and rounding data generating means for generating a rounding constant according to a detection output, wherein said detection output is based on at least one of said first detecting means, said second detecting means, and said positive detecting means.

2. The floating point computing device as claimed in claim 1, further comprising:

mantissa computing means for adjusting said mantissa numeral stored in said mantissa register according to said rounding constant.

3. The floating point computing device as claimed in claim 2, wherein:

said mantissa computation means adds said rounding constant to said mantissa numeral stored in said mantissa register and stores a sum of said mantissa numeral and said rounding constant in said mantissa register when said positive detecting means detects that said mantissa numeral is positive; and said mantissa computation means subtracts said mantissa numeral stored in said mantissa register from said rounding constant and stores a difference between said mantissa numeral and said rounding constant in said mantissa register when said positive detecting means detects that said mantissa is negative.

4. The floating point computing device as claimed in claim 3, wherein said difference between said mantissa numeral and said rounding constant is positive.

5. The floating point computing device as claimed in claim 3, further comprising:

overflow detecting means for detecting whether a lower protection digit of said mantissa numeral overflows or not when said rounding constant is added to said mantissa numeral, wherein said lower protection digit is stored in said mantissa register and is appended at a last end of said mantissa.

6. The floating point computing device as claimed in claim 5, wherein:

said rounding data generating means generates a rounding constant according to an overflow output and said detection output, wherein said overflow output is output from said overflow detecting means and indicates whether said lower protection digit has overflowed or not; and said shift generating means generates a shift number according to said detection output and said overflow output.

7. The floating point computing device as claimed in claim 5, wherein:

said overflow detecting means detects whether said lower protection digit overflows or not by detecting a value of a significant bit of said lower protection digit.

8. The floating point computing device as claimed in claim 1, further comprising:

shift data generating means for generating a shift number according to said detection output; and shift computation means for shifting said bits of said mantissa numeral stored in said mantissa register based on said shift number.

9. The floating point computing device as claimed in claim 8, wherein:

said shift data generating means generates N as said shift number when said positive detecting means detects that said mantissa numeral is positive and said first detecting means detects that all bits of N highest-order digits of said mantissa numeral, except for a high protection digit of said mantissa numeral, are 0, wherein said high protection digit is stored in said mantissa register and is appended at a first end of said mantissa.

10. The floating point computing device as claimed in claim 8, wherein:

said shift data generating means generates N as said shift number when said positive detecting means detects that said mantissa numeral is negative and said second detecting means detects that all bits of N highest-order digits of said mantissa numeral, except for a high protection digit of said mantissa numeral, are 1, wherein said high protection digit is stored in said mantissa register and is appended at a first end of said mantissa.

11. The floating point computing device as claimed in claim 1, further comprising:

a second mantissa register for storing at least a second mantissa of a second floating point number, wherein said second mantissa register is capable of storing a second plurality of digits and wherein said second plurality of digits forms a second mantissa numeral;

a first exponent register for storing a first exponent of said floating point number;

a second exponent register for storing a second exponent of said second floating point number.

12. The floating point computing device as claimed in claim 11, further comprising:

exponent computing means for adjusting said first exponent or said second exponent based on a difference between said first exponent and said second exponent, wherein said first exponent or second exponent is adjusted such that a value in said first exponent register equals a value in said second exponent register.

13. The floating point computing device as claimed in claim 1, further comprising:

a second mantissa register for storing at least a second mantissa of a second floating point number, wherein said second mantissa register is capable of storing a second plurality of digits and wherein said second plurality of digits forms a second mantissa numeral;

a first sign register for storing a first sign bit of said floating point number;

a second sign register for storing a second sign bit of said second floating point number;

a sign processing means for inverting said first sign bit if said positive detecting means determines that said mantissa is negative and for inverting said second sign bit if said positive detecting means determines that said second mantissa is negative.

14. The floating point computing device as claimed in claim 1, further comprising:

third detecting means for determining whether or not a most significant bit of a least significant digit of said mantissa numeral is 1.

15. A floating point computing device which determines a resultant floating point number of an arithmetic operation, said floating point computing device comprising:

a mantissa register for storing at least a mantissa of a floating point number, wherein said mantissa register is capable of storing a plurality of digits and wherein said plurality of digits forms a mantissa numeral;

first detecting means for detecting whether all bits of at least one of said plurality of digits of said mantissa numeral are 0 or not;

second detecting means for detecting whether all bits of at least one of said plurality of digits of said mantissa numeral are 1 or not;

positive detecting means for detecting whether said mantissa numeral stored in said mantissa register is positive or not;

rounding data generating means for generating a rounding constant according to a detection output, wherein said detection output is based on said first detecting means, said second detecting means, and said positive detecting means; and mantissa computing means for adjusting said mantissa numeral, stored in said mantissa register, wherein said mantissa computation means adds said rounding constant to said mantissa numeral stored in said mantissa register and stores a sum of said mantissa numeral and said rounding constant in said mantissa register when said positive detecting means detects that said mantissa numeral is positive and wherein said mantissa computation means subtracts said mantissa numeral stored in said mantissa register from said rounding constant and stores a difference between said rounding constant and said positive detecting means detects that said mantissa numeral in said mantissa register when said mantissa is negative.

16. The floating point computing device as claimed in claim 15, further comprising:

overflow detecting means for detecting whether a lower protection digit of said mantissa numeral overflows or not when said rounding constant is added to said mantissa numeral, wherein said lower protection digit is stored in said mantissa register and is appended at a last end of said mantissa;

shift data generating means for generating a shift number according to said detection output; and shift computation means for shifting said bits of said mantissa numeral stored in said mantissa register based on said shift number.

17. The floating point computing device as claimed in claim 16, wherein said overflow detecting means detects whether said lower protection digit overflows or not by detecting the value of a significant bit of said lower protection digit.

18. The floating point computing device as claimed in claim 17, wherein:

said shift data generating means generates N as said shift number when said positive detecting means detects that said mantissa numeral is positive and said first detecting means detects that all bits of N highest-order digits of said mantissa numeral, except for a high protection digit of said mantissa numeral, are 0, wherein said high protection digit is stored in said mantissa register and is appended at a first end of said mantissa.

19. The floating point computing device as claimed in claim 18, wherein:

said shift data generating means generates N as said shift number when said positive detecting means detects that said mantissa numeral is negative and said second detecting means detects that all bits of N highest-order digits of said mantissa numeral, except for a high protection digit of said mantissa numeral, are 1, wherein said high protection digit is stored in said mantissa register and is appended at a first end of said mantissa.

* * * * *

UNITED STATES PATENT AND TRADEMARK OFFICE
CERTIFICATE OF CORRECTION

PATENT NO.   : 5,469,377
DATED        : November 21, 1995
INVENTOR(S)  : Yoshinobu AMANO It is certified that error(s) appears in the above-identified patent and that said Letters Patent is hereby corrected as shown below:

Col. 5, ine 36, delete "delta" and insert --data--.

Col. 12, line 15, delete "00000980H" and insert --00000098H--.

Col. 12, line 37, delete (first occurrence) "0" and insert --1--.

Col. 13, line 29, delete "a".

Col. 15, line 5, after "rounder" (second occurrence), insert --150--.

Col. 15, line 56, after "step" insert --4--.

Signed and Sealed this

Twenty-fifth Day of June, 1996

Attest:

BRUCE LEHMAN

Attesting Officer

Commissioner of Patents and Trademarks